United States Patent
Han et al.

(10) Patent No.: US 11,191,072 B2
(45) Date of Patent: Nov. 30, 2021

(54) INFORMATION TRANSMISSION METHOD AND RADIO ACCESS NETWORK DEVICE

(71) Applicant: HUAWEI TECHNOLOGIES CO., LTD., Guangdong (CN)

(72) Inventors: Lifeng Han, Shenzhen (CN); Yada Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/456,100

(22) Filed: Jun. 28, 2019

(65) Prior Publication Data

US 2019/0320436 A1 Oct. 17, 2019

Related U.S. Application Data

(63) Continuation of application No. PCT/CN2017/118616, filed on Dec. 26, 2017.

(30) Foreign Application Priority Data

Dec. 29, 2016 (CN) .......................... 201611266389.X

(51) Int. Cl.
*H04W 72/04* (2009.01)
*H04W 28/08* (2009.01)
(Continued)

(52) U.S. Cl.
CPC ....... *H04W 72/0426* (2013.01); *H04W 12/04* (2013.01); *H04W 16/12* (2013.01);
(Continued)

(58) Field of Classification Search
CPC ..... H04W 48/18; H04W 24/02; H04W 16/12; H04W 12/04; H04W 16/06; H04W 16/10; H04W 28/0268; H04W 16/14
See application file for complete search history.

(56) References Cited

U.S. PATENT DOCUMENTS

| | | |
|---|---|---|
| 2001/0030953 A1 | 10/2001 | Chang |
| 2009/0310568 A1 | 12/2009 | Chen et al. |

(Continued)

FOREIGN PATENT DOCUMENTS

| | | |
|---|---|---|
| CN | 1435963 A | 8/2003 |
| CN | 102088723 A | 6/2011 |

(Continued)

OTHER PUBLICATIONS

Author Unknown, Mobile and wireless communications Enablers for the Twenty-twenty Information Society-II Deliverable D5.1 Draft Synchronous Control Functions and Resource Abstraction Considerations, version 1.0, May 31, 2016, pp. 1-129 (Year: 2016).*

(Continued)

*Primary Examiner* — Christopher M Crutchfield
(74) *Attorney, Agent, or Firm* — Fish & Richardson P.C.

(57) ABSTRACT

Example information transmission methods are described. One example method includes that a first base station receives resource status information from a second base station. The resource status information includes a service classification identifier and a resource status corresponding to the service classification identifier. The service classification identifier is a service type identifier or slice identification information.

25 Claims, 12 Drawing Sheets

(51) Int. Cl.
*H04W 72/08* (2009.01)
*H04W 72/10* (2009.01)
*H04W 16/12* (2009.01)
*H04W 12/04* (2021.01)
*H04W 48/18* (2009.01)

(52) U.S. Cl.
CPC .......... *H04W 28/08* (2013.01); *H04W 48/18* (2013.01); *H04W 72/044* (2013.01); *H04W 72/0493* (2013.01); *H04W 72/087* (2013.01); *H04W 72/10* (2013.01)

(56) References Cited

U.S. PATENT DOCUMENTS

| | | | |
|---|---|---|---|
| 2011/0053598 A1* | 3/2011 | Ahluwalia | H04W 28/08 455/436 |
| 2012/0040684 A1* | 2/2012 | Gao | H04W 28/08 455/453 |
| 2013/0072201 A1* | 3/2013 | Nakamura | H04W 16/08 455/445 |
| 2014/0200011 A1* | 7/2014 | Moilanen | H04L 5/0037 455/450 |
| 2015/0111575 A1* | 4/2015 | Lei | H04W 28/0289 455/436 |
| 2015/0139144 A1 | 5/2015 | Chai et al. | |
| 2015/0230113 A1 | 8/2015 | Zhang et al. | |
| 2015/0373578 A1* | 12/2015 | Lee | H04W 92/04 370/236 |
| 2016/0037400 A1* | 2/2016 | Kai | H04W 36/0061 370/331 |
| 2016/0037541 A1 | 2/2016 | Kim et al. | |
| 2017/0079059 A1* | 3/2017 | Li | H04W 16/02 |
| 2019/0394783 A1* | 12/2019 | Byun | H04W 72/0446 |

FOREIGN PATENT DOCUMENTS

| | | |
|---|---|---|
| CN | 102413521 A | 4/2012 |
| CN | 102448118 A | 5/2012 |
| CN | 104105135 A | 10/2014 |
| EP | 2892273 B1 | 4/2018 |
| EP | 3582414 A1 | 12/2019 |
| JP | 2019525651 A | 9/2019 |
| WO | 2011013769 A1 | 2/2011 |
| WO | 2014034118 A1 | 3/2014 |
| WO | 2018030508 A1 | 2/2018 |

OTHER PUBLICATIONS

Author Unknown, Mobile and wireless communications Enablers for the Twenty-twenty Information Society-II Deliverable D6.2 5G Asynchronous Control Functions and Overall Control Plane Design, version 1.0, Apr. 30, 2017, pp. 1-167 (Year: 2017).*

Author Unknown, 5G PPP Architecture Working Group View on 5G Architecture, version 1.0, Jun. 2016, pp. 1-61 (Year: 2016).*

Author Unknown, Preliminary Views and Initial Considerations on 5G RAN Architecture and Functional Design, Mar. 4, 2016, pp. 1-27 (Year: 2016).*

Srinivas Kumar Tangudu, Rajesh Banda, Raghuram Krishnamurthy, Niraj Nanavaty, Subramanya Chandrashekar, Srinivas Bandi, 5G RAN Optimizations through Radio Shared Data Layer (RSDL), Dec. 1, 2017, pp. 1-4 (Year: 2017).*

Author Unknown, Slice Availability, Doc. No. R2-1701052, Feb. 17, 2017, pp. 1-5 (Year: 2017).*

Author Unknown, Slice exchange and update over Xn, Doc. No. R3-171788, May 15, 2017, pp. 1-4 (Year: 2017).*

Author Unknown, RAN supporting Network Slicing, Doc. No. R3-171047, Apr. 7, 2017, pp. 1-2 (Year: 2017).*

PCT International Search Report and Written Opinion in International Application No. PCT/CN2017/118,616, dated Dec. 29, 2016, 17 pages (With English Translation).

Office Action issued in Chinese Application No. 201611266389.X dated Oct. 9, 2019, 12 pages (With English Translation).

Office Action issued in Japanese Application No. 2019-535765 dated Aug. 3, 2020, 12 pages (with English translation).

Extended European Search Report issued in European Application No. 17888596.8 dated Nov. 8, 2019, 9 pages.

EPO Communication pursuant to Article 94(3) EPC issued in European Application No. 17888596.8 dated Oct. 10, 2020, 6 pages.

Office Action issued in Japanese Application No. 2019-535765 dated Jul. 5, 2021, 5 pages (with English translation).

* cited by examiner

# INFORMATION TRANSMISSION METHOD AND RADIO ACCESS NETWORK DEVICE

CROSS-REFERENCE TO RELATED APPLICATIONS

This application a continuation of International Application No. PCT/CN2017/118616, filed on Dec. 26, 2017, which claims priority to Chinese Patent Application No. 201611266389.X, filed on Dec. 29, 2016. The disclosures of the aforementioned applications are hereby incorporated by reference in their entireties.

TECHNICAL FIELD

Embodiments of the present invention relate to the communications field, and in particular, to an information transmission method and a radio access network device.

BACKGROUND

With continuous development of communications technologies, a user has an increasingly high requirement on a wireless communications system, for example, a higher service transmission rate, a shorter latency, and a wider frequency band. Currently, a requirement of the user on the wireless communications system may be met by performing a radio resource management (radio resource management, RRM) operation such as load balancing or load control. Before an RRM operation is performed, base stations need to exchange resource status (resource status) information. In the prior art, a specific process in which base stations exchange resource status information is as follows: When a load of a cell in which a base station 1 is located reaches a preset threshold, the base station 1 may send a resource status request (resource status request) to a base station 2, to instruct the base station 2 to report resource status information of a cell in which the base station 2 is located. After receiving and determining to accept the resource status request, the base station 2 may send a resource status response (resource status response) to the base station 1, and send the resource status information of the cell in which the base station 2 is located to the base station 1 by using resource status update (resource status update) information. In this way, the base station 1 may perform an operation such as load balancing or load control based on the received resource status information, to reduce the load of the cell in which the base station 1 is located.

In addition, in an existing wireless communications system, a plurality of base stations with different transmit power or different access types are usually deployed together within a geographical range, to increase a capacity of the wireless communications system. However, in this hybrid deployment manner, there may be interference between base stations. In the prior art, the base stations exchange load information (load information), so that interference control and management can be performed based on the load information, to reduce interference between the base stations. A specific process in which the base stations exchange the load information is as follows: A base station may report, periodically or in an event-based manner, load information of a cell in which the base station is located to a surrounding base station. In this way, the surrounding base station may perform interference control and management based on the received load information.

In the process of exchanging the resource status information and the load information, at least the following problem exists: In the prior art, the base stations exchange the resource status information or the load information on a cell basis, and this is unfavorable to a refined RRM operation and refined interference control.

SUMMARY

Embodiments of the present invention provide an information transmission method and a radio access network device, to resolve a problem that a refined RRM operation and refined interference control are difficult to implement when resource status information and load information are exchanged on a cell basis.

To achieve the foregoing objective, the following technical solutions are used in the embodiments of the present invention:

A first aspect of the embodiments of the present invention provides a resource status information transmission method, including:

receiving, by a first base station, resource status information from a second base station, where the resource status information includes a service classification identifier and a resource status corresponding to the service classification identifier, and the service classification identifier is a service type identifier or slice (slice) identification information.

The service type identifier may include at least one of: several QoS parameters in a quality of service (quality of service, QoS) parameter set, a QoS parameter set index value, and a group identifier of a group in which a QoS parameter set index value is located.

According to the resource status information transmission method provided in the embodiments of the present invention, the first base station receives, from the second base station, the resource status information that includes the service classification identifier and the resource status corresponding to the service classification identifier. In this way, the first base station can learn load statuses of different services based on resource statuses corresponding to different service classification identifiers, and therefore can precisely initiate an RRM operation such as a handover, load balancing, or load control based on the load statuses of the different services, thereby implementing a refined RRM operation at a service level, and improving network utilization and user experience.

With reference to the first aspect, in a possible implementation, after the receiving, by a first base station, resource status information from a second base station, the resource status information transmission method may further include: determining, by the first base station based on the resource status corresponding to the service classification identifier, an RRM policy of a service corresponding to the service classification identifier.

With reference to the first aspect and the foregoing possible implementation, in another possible implementation, before the receiving, by a first base station, resource status information from a second base station, the resource status information transmission method may further include: sending, by the first base station, a first message to the second base station, where the first message is used to request the second base station to report a resource status; the first message may include indication information, a first cell identifier list, and a first resource type set, or the first message may include the service classification identifier, a first cell identifier list, and a first resource type set; and the indication information is used to instruct the second base station to separately report resource statuses based on different service classifications, the first cell identifier list includes an identifier of a cell whose resource status needs to be reported, and the first resource type set includes a type of a resource whose resource status needs to be reported.

With reference to the first aspect and the foregoing possible implementations, in another possible implementation, after the sending, by the first base station, a first message to the second base station, the method further includes:

receiving, by the first base station, a second message from the second base station, where the second message includes at least one of the following: a second cell identifier list and a second resource type set, the second cell identifier list includes an identifier that is of a cell whose resource status can be reported and that is in the first cell identifier list, and the second resource type set includes a type that is of a resource whose resource status can be reported and that is in the first resource type set.

With reference to the first aspect and the foregoing possible implementations, in another possible implementation, the second message may further include at least one of the following: a service classification identifier set, a failed cell identifier list, a type that is of a resource whose resource status cannot be reported and that is corresponding to a cell identifier included in the failed cell identifier list, and a cause that leads to a failure in reporting a resource status and that is corresponding to the cell identifier included in the failed cell identifier list; and the service classification identifier set includes a service classification identifier of a service whose resource status cannot be reported, and the failed cell identifier list includes an identifier that is of a cell whose resource status cannot be reported and that is in the first cell identifier list.

With reference to the first aspect and the foregoing possible implementations, in another possible implementation, after the sending, by the first base station, a first message to the second base station, the resource status information transmission method may further include: receiving, by the first base station, a third message from the second base station, where the third message is used to indicate that a resource status cannot be reported, the third message includes at least one of the following: a service classification identifier set, a failed cell identifier list, a type that is of a resource whose resource status cannot be reported and that is corresponding to a cell identifier included in the failed cell identifier list, and a cause that leads to a failure in reporting a resource status and that is corresponding to the cell identifier included in the failed cell identifier list.

With reference to the first aspect and the foregoing possible implementations, in another possible implementation, the first message may further include at least one of a reporting period, a reporting start indication, and a reporting end indication, where the reporting period is used to indicate a period of resource status reporting, the reporting start indication is used to indicate that the resource status reporting starts, and the reporting end indication is used to indicate that the resource status reporting ends.

With reference to the first aspect and the foregoing possible implementation, in another possible implementation, when the first message includes the service classification identifier, the first cell identifier list, and the first resource type set, the resource status information transmission method may further include: generating, by the first base station, the first message, where different service classification identifiers in the first message are corresponding to at least one of different resource type sets, different cell identifier lists, different reporting periods, different reporting start indications, and different reporting end indications.

With reference to the first aspect and the foregoing possible implementations, in another possible implementation, when the first message includes the service classification identifier, the first cell identifier list, and the first resource type set, before the sending, by the first base station, a first message to the second base station, the resource status information transmission method may further include: obtaining, by the first base station, the service classification identifier of a service provided by the second base station.

With reference to the first aspect and the foregoing possible implementations, in another possible implementation, the service type may include at least one of an enhanced mobile broadband (Enhanced Mobile Broadband, eMBB) service, a massive machine type communications (massive machine type communications, mMTC) service, and an ultra-reliable and low-latency communications (ultra-reliable and low-latency communications, URLLC) service.

A second aspect of the embodiments of the present invention provides a resource status information transmission method, including:

obtaining, by a second base station, resource status information, where the resource status information includes a service classification identifier and a resource status corresponding to the service classification identifier, and the service classification identifier is a service type identifier or slice identification information; and sending, by the second base station, the resource status information to a first base station.

According to the resource status information transmission method provided in the embodiments of the present invention, the second base station obtains and sends, to the first base station, the resource status information that includes the service classification identifier and the resource status corresponding to the service classification identifier. In this way, the first base station can learn load statuses of different services based on resource statuses corresponding to different service classification identifiers, and therefore can precisely initiate an RRM operation such as a handover, load balancing, or load control based on the load statuses of the different services, thereby implementing a refined RRM operation at a service level, and improving network utilization and user experience.

With reference to the second aspect, in a possible implementation, before the obtaining, by a second base station, resource status information, the resource status information transmission method may further include: receiving, by the second base station, a first message from the first base station, where the first message is used to request the second base station to report a resource status, the first message may include indication information, a first cell identifier list, and a first resource type set, or the first message may include the service classification identifier, a first cell identifier list, and a first resource type set, the indication information is used to instruct the second base station to separately report resource statuses based on different service classifications, the first cell identifier list includes an identifier of a cell whose resource status needs to be reported, and the first resource type set includes a type of a resource whose resource status needs to be reported; and when the first message includes the indication information, the first cell identifier list, and the first resource type set, the obtaining, by a second base station, resource status information may specifically include: obtaining, by the second base station based on the first cell identifier list, the first resource type set, and different service classifications, a resource status of a service corresponding to the service classification identifier, to obtain the resource status information; or when the first message includes the service classification identifier, the first cell identifier list, and the first resource type set, the obtaining, by a second base station, resource status information may specifically include: obtaining, by the second base station based on the first cell identifier list and the first resource type set, a resource status of a service corresponding to the service classification identifier, to obtain the resource status information.

With reference to the second aspect and the foregoing possible implementation, in another possible implementation, before the obtaining, by a second base station, resource status information, the resource status information transmission method may further include: determining, by the second base station, to accept a resource status reporting request from the first base station, and determining a second cell identifier list and a second resource type set based on the first message, where the second cell identifier list includes an identifier that is of a cell whose resource status can be reported and that is in the first cell identifier list, and the second resource type set includes a type that is of a resource whose resource status can be reported and that is in the first resource type set; the obtaining, by the second base station based on the first cell identifier list, the first resource type set, and different service classifications, a resource status of a service corresponding to the service classification identifier, to obtain the resource status information may specifically include: obtaining, by the second base station based on the second cell identifier list, the second resource type set, and the different service classifications, the resource status of the service corresponding to the service classification identifier, to obtain the resource status information; and the obtaining, by the second base station based on the first cell identifier list and the first resource type set, a resource status of a service corresponding to the service classification identifier, to obtain the resource status information may specifically include: obtaining, by the second base station based on the second cell identifier list and the second resource type set, the resource status of the service corresponding to the service classification identifier, to obtain the resource status information.

With reference to the second aspect and the foregoing possible implementations, in another possible implementation, after the determining, by the second base station, to accept a resource status reporting request from the first base station, the resource status information transmission method may further include: sending, by the second base station, a second message to the first base station, where the second message includes at least one of the following: the second cell identifier list and the second resource type set.

With reference to the second aspect and the foregoing possible implementations, in another possible implementation, the second message may further include at least one of the following: a service classification identifier set, a failed cell identifier list, a type that is of a resource whose resource status cannot be reported and that is corresponding to a cell identifier included in the failed cell identifier list, and a cause that leads to a failure in reporting a resource status and that is corresponding to the cell identifier included in the failed cell identifier list; and the service classification identifier set includes a service classification identifier of a service whose resource status cannot be reported, and the failed cell identifier list includes an identifier that is of a cell whose resource status cannot be reported and that is in the first cell identifier list.

With reference to the second aspect and the foregoing possible implementation, in another possible implementation, the resource status information transmission method may further include: determining, by the second base station, that a resource status reporting request from the first base station cannot be accepted; and sending, by the second base station, a third message to the first base station, where the third message is used to indicate that a resource status cannot be reported, and the third message may include at least one of the following: a service classification identifier set, a failed cell identifier list, a type that is of a resource whose resource status cannot be reported and that is corresponding to a cell identifier included in the failed cell identifier list, and a cause that leads to a failure in reporting a resource status and that is corresponding to the cell identifier included in the failed cell identifier list.

With reference to the second aspect and the foregoing possible implementations, in another possible implementation, the first message may further include at least one of a reporting period, a reporting start indication, and a reporting end indication, where the reporting period is used to indicate a period of resource status reporting, the reporting start indication is used to indicate that the resource status reporting starts, and the reporting end indication is used to indicate that the resource status reporting ends; and the sending, by the second base station, the resource status information to a first base station may specifically include: sending, by the second base station, the resource status information to the first base station based on the first message.

With reference to the second aspect and the foregoing possible implementations, in another possible implementation, the service type may include at least one of an eMBB service, an mMTC service, and a URLLC service.

A third aspect of the embodiments of the present invention provides a load information transmission method, including:

receiving, by a first base station, load information from a second base station, where the load information includes a service classification identifier and a load corresponding to the service classification identifier, and the service classification identifier is a service type identifier or slice identification information.

According to the load information transmission method provided in the embodiments of the present invention, the first base station receives, from the second base station, the load information that includes the service classification identifier and the load corresponding to the service classification identifier. In this way, the first base station can learn load statuses of different services based on loads corresponding to different service classification identifiers, and therefore can precisely perform interference control based on the load statuses of the different services, thereby implementing refined interference control at a service level, and improving network utilization and user experience.

With reference to the third aspect, in a possible implementation, after the receiving, by a first base station, load information from a second base station, the load information transmission method may further include: performing, by the first base station, interference control based on the load corresponding to the service classification identifier.

With reference to the third aspect and the foregoing possible implementation, in another possible implementation, the load may include at least one of an uplink interference overload indication (UL Interference Overload Indication), relative narrowband Tx power (relative narrowband Tx power, RNTP), and an uplink high interference indication (UL High Interference Indication).

With reference to the third aspect and the foregoing possible implementations, in another possible implementation, the service type may include at least one of an eMBB service, an mMTC service, and a URLLC service.

A fourth aspect of the embodiments of the present invention provides a load information transmission method, including:

obtaining, by a second base station, load information, where the load information includes a service classification identifier and a load corresponding to the service classification identifier, and the service classification identifier is a service type identifier or slice identification information; and sending, by the second base station, the load information to a first base station.

According to the load information transmission method provided in the embodiments of the present invention, the second base station obtains and sends, to the first base station, the load information that includes the service classification identifier and the load corresponding to the service classification identifier. In this way, the first base station can learn load statuses of different services based on loads corresponding to different service classification identifiers, and therefore can precisely perform interference control based on the load statuses of the different services, thereby implementing refined interference control at a service level, and improving network utilization and user experience.

With reference to the fourth aspect, in a possible implementation, the load may include at least one of a UL interference overload indication, RNTP, and a UL high interference indication.

With reference to the fourth aspect and the foregoing possible implementation, in another possible implementation, the service type may include at least one of an eMBB service, an mMTC service, and a URLLC service.

A fifth aspect of the embodiments of the present invention provides an information transmission method, including:

receiving, by a first base station from a second base station, priority information or type information of all or some physical resource blocks (physical resource block, PRB) in a cell managed by the second base station, where the type information of the PRB is a numerology (numerology) type corresponding to the PRB.

According to the information transmission method provided in the embodiments of the present invention, the first base station receives the priority information or the type information of all the or some PRBs in the cell managed by the second base station from the second base station. In this way, the first base station may allocate, based on the priority information or the type information of all the or some PRBs in the cell managed by the second base station, resources for a cell managed by the first base station.

With reference to the fifth aspect, in a possible implementation, the receiving, by a first base station from a second base station, priority information or type information of all or some PRBs included in a cell of the second base station may specifically include: receiving, by the first base station, load information from the second base station, where the load information carries the priority information or the type information of all the or some PRBs in the cell managed by the second base station.

With reference to the fifth aspect and the foregoing possible implementation, in another possible implementation, the receiving, by a first base station from a second base station, priority information or type information of all or some PRBs included in a cell of the second base station may specifically include: receiving, by the first base station, a first message from the second base station, where the first message carries the priority information or the type information of all the or some PRBs in the cell managed by the second base station.

A sixth aspect of the embodiments of the present invention provides an information transmission method, including:

sending, by a second base station to a first base station, priority information or type information of all or some PRBs in a cell managed by the second base station, where the type information of the PRB is a numerology type corresponding to the PRB.

According to the information transmission method provided in the embodiments of the present invention, the second base station sends the priority information or the type information of all the or some PRBs in the cell managed by the second base station to the first base station. In this way, the first base station may allocate, based on the priority information or the type information of all the or some PRBs in the cell managed by the second base station, resources for a cell managed by the first base station.

With reference to the sixth aspect, in a possible implementation, the sending, by a second base station to a first base station, priority information or type information of all or some PRBs included in a cell of the second base station may specifically include: sending, by the second base station, load information to the first base station, where the load information carries the priority information or the type information of all the or some PRBs in the cell managed by the second base station.

With reference to the sixth aspect and the foregoing possible implementation, in another possible implementation, the sending, by a second base station to a first base station, priority information or type information of all or some PRBs included in a cell of the second base station may specifically include: sending, by the second base station, a first message to the first base station, where the first message carries the priority information or the type information of all the or some PRBs in the cell managed by the second base station.

A seventh aspect of the embodiments of the present invention provides a first base station, including:

a receiving unit, configured to receive resource status information from a second base station, where the resource status information includes a service classification identifier and a resource status corresponding to the service classification identifier, and the service classification identifier is a service type identifier or slice identification information.

With reference to the seventh aspect, in a possible implementation, the first base station further includes a determining unit, configured to determine, based on the resource status that is corresponding to the service classification identifier and that is received by the receiving unit, a radio resource management RRM policy of a service corresponding to the service classification identifier.

With reference to the seventh aspect and the foregoing possible implementation, in another possible implementation, the first base station further includes a sending unit, configured to send a first message to the second base station, where the first message is used to request the second base station to report a resource status; the first message includes indication information, a first cell identifier list, and a first resource type set, or the first message includes the service classification identifier, a first cell identifier list, and a first resource type set; and the indication information is used to instruct the second base station to separately report resource statuses based on different service classifications, the first cell identifier list includes an identifier of a cell whose resource status needs to be reported, and the first resource type set includes a type of a resource whose resource status needs to be reported.

With reference to the seventh aspect and the foregoing possible implementations, in another possible implementation, the receiving unit is further configured to receive a second message from the second base station, where the second message includes at least one of the following: a second cell identifier list and a second resource type set, where the second cell identifier list includes an identifier that is of a cell whose resource status can be reported and that is in the first cell identifier list, and the second resource type set includes a type that is of a resource whose resource status can be reported and that is in the first resource type set.

With reference to the seventh aspect and the foregoing possible implementations, in another possible implementation, the second message received by the receiving unit further includes at least one of the following: a service classification identifier set, a failed cell identifier list, a type that is of a resource whose resource status cannot be reported and that is corresponding to a cell identifier included in the failed cell identifier list, and a cause that leads to a failure in reporting a resource status and that is corresponding to the cell identifier included in the failed cell identifier list; and the service classification identifier set includes a service classification identifier of a service whose resource status cannot be reported, and the failed cell identifier list includes an identifier that is of a cell whose resource status cannot be reported and that is in the first cell identifier list.

With reference to the seventh aspect and the foregoing possible implementations, in another possible implementation, the receiving unit is further configured to receive a third message from the second base station, where the third message is used to indicate that a resource status cannot be reported, the third message includes at least one of the following: a service classification identifier set, a failed cell identifier list, a type that is of a resource whose resource status cannot be reported and that is corresponding to a cell identifier included in the failed cell identifier list, and a cause that leads to a failure in reporting a resource status and that is corresponding to the cell identifier included in the failed cell identifier list.

With reference to the seventh aspect and the foregoing possible implementations, in another possible implementation, the first message sent by the sending unit further includes at least one of a reporting period, a reporting start indication, and a reporting end indication, where the reporting period is used to indicate a period of resource status reporting, the reporting start indication is used to indicate that the resource status reporting starts, and the reporting end indication is used to indicate that the resource status reporting ends.

With reference to the seventh aspect and the foregoing possible implementations, in another possible implementation, when the first message includes the service classification identifier, the first cell identifier list, and the first resource type set, the first base station further includes a generation unit, configured to generate the first message, where different service classification identifiers in the first message are corresponding to at least one of different resource type sets, different cell identifier lists, different reporting periods, different reporting start indications, and different reporting end indications.

With reference to the seventh aspect and the foregoing possible implementations, in another possible implementation, when the first message includes the service classification identifier, the first cell identifier list, and the first resource type set, the first base station further includes an obtaining unit, configured to obtain the service classification identifier of a service provided by the second base station.

With reference to the seventh aspect and the foregoing possible implementations, in another possible implementation, the service type may include at least one of an eMBB service, an mMTC service, and a URLLC service.

An eighth aspect of the embodiments of the present invention provides a second base station, including:

an obtaining unit, configured to obtain resource status information, where the resource status information includes a service classification identifier and a resource status corresponding to the service classification identifier, and the service classification identifier is a service type identifier or slice identification information; and a sending unit, configured to send the resource status information obtained by the obtaining unit to a first base station.

With reference to the eighth aspect, in a possible implementation, the second base station further includes a receiving unit, configured to receive a first message from the first base station, where the first message is used to request the second base station to report a resource status, the first message includes indication information, a first cell identifier list, and a first resource type set, or the first message includes the service classification identifier, a first cell identifier list, and a first resource type set, the indication information is used to instruct the second base station to separately report resource statuses based on different service classifications, the first cell identifier list includes an identifier of a cell whose resource status needs to be reported, and the first resource type set includes a type of a resource whose resource status needs to be reported; and when the first message includes the indication information, the first cell identifier list, and the first resource type set, the obtaining unit is specifically configured to obtain, based on the first cell identifier list and the first resource type set that are received by the receiving unit, and different service classifications, a resource status of a service corresponding to the service classification identifier, to obtain the resource status information; or when the first message includes the service classification identifier, the first cell identifier list, and the first resource type set, the obtaining unit is specifically configured to obtain, based on the first cell identifier list and the first resource type set that are received by the receiving unit, a resource status of a service corresponding to the service classification identifier, to obtain the resource status information.

With reference to the eighth aspect and the foregoing possible implementation, in another possible implementation, the second base station further includes a determining unit, configured to: determine to accept a resource status reporting request from the first base station, and determine a second cell identifier list and a second resource type set based on the first message, where the second cell identifier list includes an identifier that is of a cell whose resource status can be reported and that is in the first cell identifier list, and the second resource type set includes a type that is of a resource whose resource status can be reported and that is in the first resource type set; the obtaining unit is specifically configured to obtain, based on the second cell identifier list, the second resource type set, and the different service classifications, the resource status of the service corresponding to the service classification identifier, to obtain the resource status information; and the obtaining unit is specifically configured to obtain, based on the second cell identifier list and the second resource type set, the resource status of the service corresponding to the service classification identifier, to obtain the resource status information.

With reference to the eighth aspect and the foregoing possible implementations, in another possible implementation, the sending unit is further configured to send a second message to the first base station, where the second message includes at least one of the following: the second cell identifier list and the second resource type set.

With reference to the eighth aspect and the foregoing possible implementations, in another possible implementation, the second message sent by the sending unit further includes at least one of the following: a service classification identifier set, a failed cell identifier list, a type that is of a resource whose resource status cannot be reported and that is corresponding to a cell identifier included in the failed cell identifier list, and a cause that leads to a failure in reporting a resource status and that is corresponding to the cell identifier included in the failed cell identifier list; and the service classification identifier set includes a service classification identifier of a service whose resource status cannot be reported, and the failed cell identifier list includes an identifier that is of a cell whose resource status cannot be reported and that is in the first cell identifier list.

With reference to the eighth aspect and the foregoing possible implementation, in another possible implementation, the determining unit is further configured to determine that a resource status reporting request from the first base station cannot be accepted; and the sending unit is further configured to send a third message to the first base station, where the third message is used to indicate that a resource status cannot be reported, and the third message includes at least one of the following: a service classification identifier set, a failed cell identifier list, a type that is of a resource whose resource status cannot be reported and that is corresponding to a cell identifier included in the failed cell identifier list, and a cause that leads to a failure in reporting a resource status and that is corresponding to the cell identifier included in the failed cell identifier list.

With reference to the eighth aspect and the foregoing possible implementations, in another possible implementation, the first message received by the receiving unit further includes at least one of a reporting period, a reporting start indication, and a reporting end indication, where the reporting period is used to indicate a period of resource status reporting, the reporting start indication is used to indicate that the resource status reporting starts, and the reporting end indication is used to indicate that the resource status reporting ends; and the sending unit is specifically configured to send the resource status information to the first base station based on the first message received by the receiving unit.

With reference to the eighth aspect and the foregoing possible implementations, in another possible implementation, the service type may include at least one of an eMBB service, an mMTC service, and a URLLC service.

A ninth aspect of the embodiments of the present invention provides a first base station, including:

a receiving unit, configured to receive load information from a second base station, where the load information includes a service classification identifier and a load corresponding to the service classification identifier, and the service classification identifier is a service type identifier or slice identification information.

With reference to the ninth aspect, in a possible implementation, the first base station further includes a processing unit, configured to perform interference control based on the load that is corresponding to the service classification identifier and that is received by the receiving unit.

With reference to the ninth aspect and the foregoing possible implementation, in another possible implementation, the load includes at least one of a UL interference overload indication, RNTP, and an uplink high interference indication.

With reference to the ninth aspect and the foregoing possible implementations, in another possible implementation, the service type may include at least one of an eMBB service, an mMTC service, and a URLLC service.

A tenth aspect of the embodiments of the present invention provides a second base station, including:

an obtaining unit, configured to obtain load information, where the load information includes a service classification identifier and a load corresponding to the service classification identifier, and the service classification identifier is a service type identifier or slice identification information; and a sending unit, configured to send the load information obtained by the obtaining unit to a first base station.

With reference to the tenth aspect, in a possible implementation, the load includes at least one of a UL interference overload indication, RNTP, and a UL high interference indication.

With reference to the tenth aspect and the foregoing possible implementation, in another possible implementation, the service type may include at least one of an eMBB service, an mMTC service, and a URLLC service.

An eleventh aspect of the embodiments of the present invention provides a first base station, including:

a receiving unit, configured to receive, from a second base station, priority information or type information of all or some PRBs in a cell managed by the second base station, where the type information of the PRB is a numerology type corresponding to the PRB.

With reference to the eleventh aspect, in a possible implementation, the receiving unit is specifically configured to receive load information from the second base station, where the load information carries the priority information or the type information of all the or some PRBs in the cell managed by the second base station.

With reference to the eleventh aspect and the foregoing possible implementation, in another possible implementation, the receiving unit is specifically configured to receive a first message from the second base station, where the first message carries the priority information or the type information of all the or some PRBs in the cell managed by the second base station.

A twelfth aspect of the embodiments of the present invention provides a second base station, including:

a sending unit, configured to send, to a first base station, priority information or type information of all or some PRBs in a cell managed by the second base station, where the type information of the PRB is a numerology type corresponding to the PRB.

With reference to the twelfth aspect, in a possible implementation, the sending unit is specifically configured to send load information to the first base station, where the load information carries the priority information or the type information of all the or some PRBs in the cell managed by the second base station.

With reference to the twelfth aspect and the foregoing possible implementation, in another possible implementation, the sending unit is specifically configured to send a first message to the first base station, where the first message carries the priority information or the type information of all the or some PRBs in the cell managed by the second base station.

A thirteenth aspect of the embodiments of the present invention provides a base station, and the base station may include at least one processor, a memory, a transceiver, and a bus, where the memory is configured to store a computer executable instruction, the processor, the memory, and the transceiver are connected by using the bus, and when the base station runs, the processor executes the computer executable instruction stored in the memory, so that the base station performs the resource status information transmission method according to any one of the first aspect or the possible implementations of the first aspect, performs the resource status information transmission method according to any one of the second aspect or the possible implementations of the second aspect, performs the load information transmission method according to any one of the third aspect or the possible implementations of the third aspect, performs the load information transmission method according to any one of the fourth aspect or the possible implementations of the fourth aspect, performs the information transmission method according to any one of the fifth aspect or the possible implementations of the fifth aspect, or performs the information transmission method according to any one of the sixth aspect or the possible implementations of the sixth aspect.

A fourteenth aspect of the embodiments of the present invention provides a chip system, including an input/output interface, at least one processor, a memory, and a bus, where the memory is configured to store a computer executable instruction, the processor and the memory are connected by using the bus, and when the chip system runs, the processor executes the computer executable instruction stored in the memory, so that the chip system performs the resource status information transmission method according to any one of the first aspect or the possible implementations of the first aspect, performs the resource status information transmission method according to any one of the second aspect or the possible implementations of the second aspect, performs the load information transmission method according to any one of the third aspect or the possible implementations of the third aspect, performs the load information transmission method according to any one of the fourth aspect or the possible implementations of the fourth aspect, performs the information transmission method according to any one of the fifth aspect or the possible implementations of the fifth aspect, or performs the information transmission method according to any one of the sixth aspect or the possible implementations of the sixth aspect.

A fifteenth aspect of the embodiments of the present invention provides a computer storage medium, configured to store a computer software instruction used by the foregoing base station, where the computer software instruction includes a program used to perform the resource status information transmission method, a program used to perform the load information transmission method, or a program used to perform the information transmission method.

A sixteenth aspect of the embodiments of the present invention provides a communications system, including:

the first base station according to any one of the seventh aspect or the possible implementations of the seventh aspect and the second base station according to any one of the eighth aspect or the possible implementations of the eighth aspect.

A seventeenth aspect of the embodiments of the present invention provides a communications system, including:

the first base station according to any one of the ninth aspect or the possible implementations of the ninth aspect and the second base station according to any one of the tenth aspect or the possible implementations of the tenth aspect.

An eighteenth aspect of the embodiments of the present invention provides a communications system, including:

the first base station according to any one of the eleventh aspect or the possible implementations of the eleventh aspect and the second base station according to any one of the twelfth aspect or the possible implementations of the twelfth aspect.

DESCRIPTION OF EMBODIMENTS

To resolve a problem that a refined RRM operation is difficult to implement when resource status information is exchanged on a cell basis, the embodiments of the present invention provide a resource status information transmission method. A basic principle of the method is as follows: A first base station receives, from a second base station, resource status information that includes a service classification identifier and a resource status corresponding to the service classification identifier, so that load statuses of different services can be learned based on resource statuses corresponding to different service classification identifiers, and therefore an RRM operation such as a handover, load balancing, or load control can be precisely initiated based on the load statuses of the different services, thereby implementing a refined RRM operation at a service level.

In addition, to resolve a problem that refined interference control is difficult to implement when load information is exchanged on a cell basis, the embodiments of the present invention provide a load information transmission method. A basic principle of the method is as follows: A first base station receives, from a second base station, load information that includes a service classification identifier and a load corresponding to the service classification identifier, so that load statuses of different services can be learned based on loads corresponding to different service classification identifiers, and therefore interference control can be precisely performed based on the load statuses of the different services, thereby implementing refined interference control at a service level.

It should be noted that, in the embodiments of the present invention, the service classification identifier may be a service type identifier, or may be slice identification information. In addition, it should be noted that scenarios in which the resource status information transmission method and the load information transmission method that are provided in the embodiments of the present invention are used include but are not limited to a single-link scenario, a dual-link scenario, a relay (Relay) scenario, and a device-to-device (device-to-device, D2D) scenario.

The following describes the implementations of the embodiments of the present invention in detail with reference to the accompanying drawings.

Figure 1:
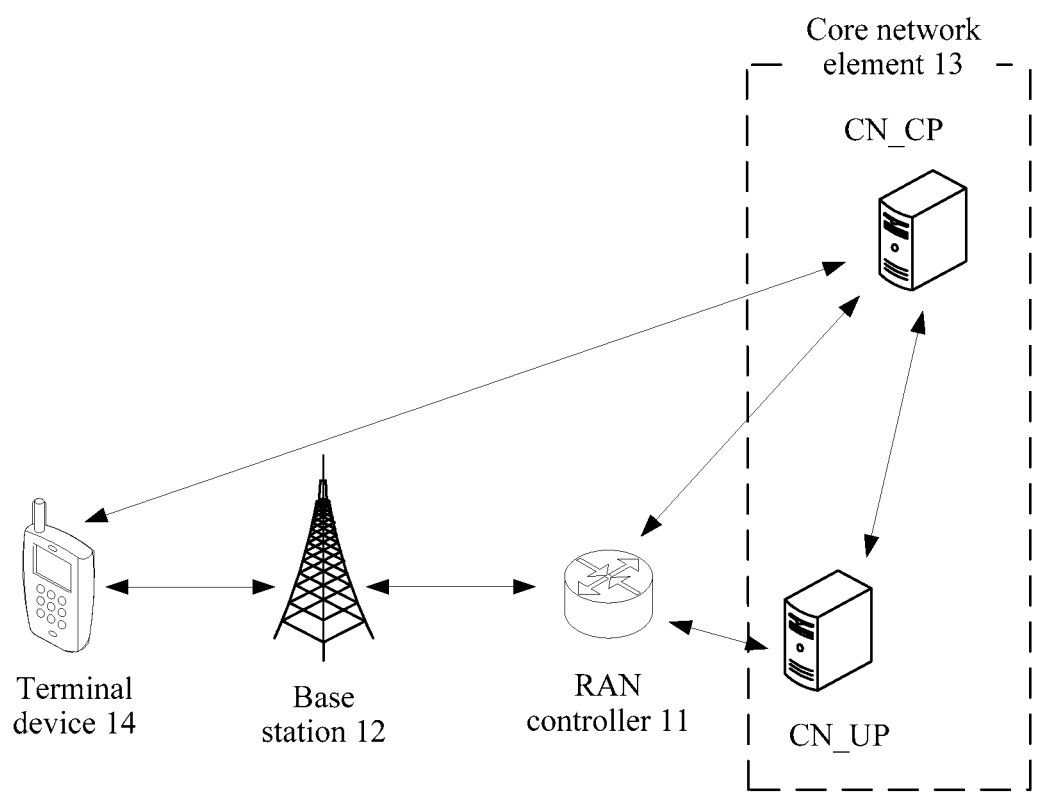
FIG. 1 is a simplified schematic diagram of a communications system to which an embodiment of the present invention is applied according to an embodiment of the present invention.

FIG. 1 is a simplified schematic diagram of a communications system to which an embodiment of the present invention may be applied. The communications system may be a fifth generation mobile communications technology (the fifth generation telecommunication, 5G) system and a subsequent evolved communications system, or may be a communications system such as a long term evolution (Long Term Evolution, LTE) system, a third generation mobile communications technology (the third generation telecommunication, 3G) system, a second generation mobile communications technology (the second generation telecommunication, 2G) system, a wireless fidelity (Wireless Fidelity, Wi-Fi) system, and a worldwide interoperability for microwave access (Worldwide Interoperability for Microwave Access, WIMAX) system. As shown in FIG. 1, the communications system may include a radio access network (radio access network, RAN) controller 11, a base station 12, a core network element 13, and a terminal device 14.

The RAN controller 11 and the base station 12 are RAN-side network elements.

The RAN controller is responsible for controlling a radio access network. For example, the RAN controller performs functions such as resource allocation and mobility management.

The base station 12 may be a wireless communications base station (base station, BS), a base station controller, or the like. The base station 12 may specifically include a user-plane base station and a control-plane base station. The base station 12 is an apparatus that is deployed in a radio access network and that is configured to provide a wireless communication function for the terminal device 14. Main functions of the base station 12 include radio resource management, internet protocol (Internet Protocol, IP) header compression and user data stream encryption, mobility management entity (mobility management entity, MME) selection during attachment of user equipment, routing user plane data to a serving gateway (serving gateway, S-GW), paging message organization and sending, broadcast message organization and sending, measurement and measurement report configuration that are used for mobility or scheduling purposes, and the like. The base station 12 may include a macro base station, a micro base station, a relay station, an access point, and the like that are in various forms. In communications systems to which different radio access technologies are applied, a device with a base station function may have different names. For example, in an LTE system, the device is referred to as an evolved NodeB (evolved NodeB, eNB, or eNodeB), in a 3G system, the device is referred to as a NodeB (NodeB), and in a next generation wireless communications system, the device is referred to as a gNB. The name "base station" may vary with evolution of communications technologies. In addition, in another possible case, the base station 12 may be another apparatus that provides a wireless communication function for the terminal device 14. For ease of description, in this embodiment of the present invention, an apparatus that provides a wireless communication function for the terminal device 14 is referred to as the base station 12.

It should be noted that the base station 12 may be specifically a first base station in the embodiments of the present invention, or may be a second base station in the embodiments of the present invention. In addition, the first base station and the second base station in the embodiments of the present invention may be base stations in a same communications system. For example, both the first base station and the second base station are evolved NodeBs (eNB) in an LTE system. For another example, both the first base station and the second base station are gNBs in a 5G system. Certainly, the first base station and the second base station may be alternatively base stations in different communications systems. For example, the first base station is an evolved NodeB (eNB) in the LTE system, and the second base station is a gNB in the 5G system. For another example, the first base station is a gNB in the 5G system, and the second base station is an evolved NodeB (eNB) in the LTE system.

The communications system may be a communications system in which a CU separation technology is used. In this case, the core network element 13 may specifically include a control plane core network element (a CN_CP shown in FIG. 1) and a user plane core network element (a CN_UP shown in FIG. 1). The control plane core network element is mainly responsible for functions such as session management, mobility management, QoS control, and subscription information management of the terminal device 14. The user plane core network element is mainly responsible for functions such as data forwarding. For example, the CN_CP may include an MME and a GW-C. In addition, in the 5G system, the CN_CP may include a network element that includes logical function modules such as mobility management (mobility management, MM) and control plane session management (SM-C). The CN_UP may include a GW-U, and the GW-U may be a network element that includes a logical function module such as user plane session management (SM-U).

The terminal device 14 may include a handheld device (for example, a mobile phone, an intelligent terminal, a multimedia device, or a streaming device), an in-vehicle device, a wearable device, or a computing device that has a wireless communication function or another processing device connected to a wireless modem, or user equipment (User Equipment, UE), a mobile station (Mobile Station, MS), a terminal device (terminal device), and the like that are in various forms. For ease of description, the devices mentioned above are collectively referred to as the terminal device 14.

Figure 2:
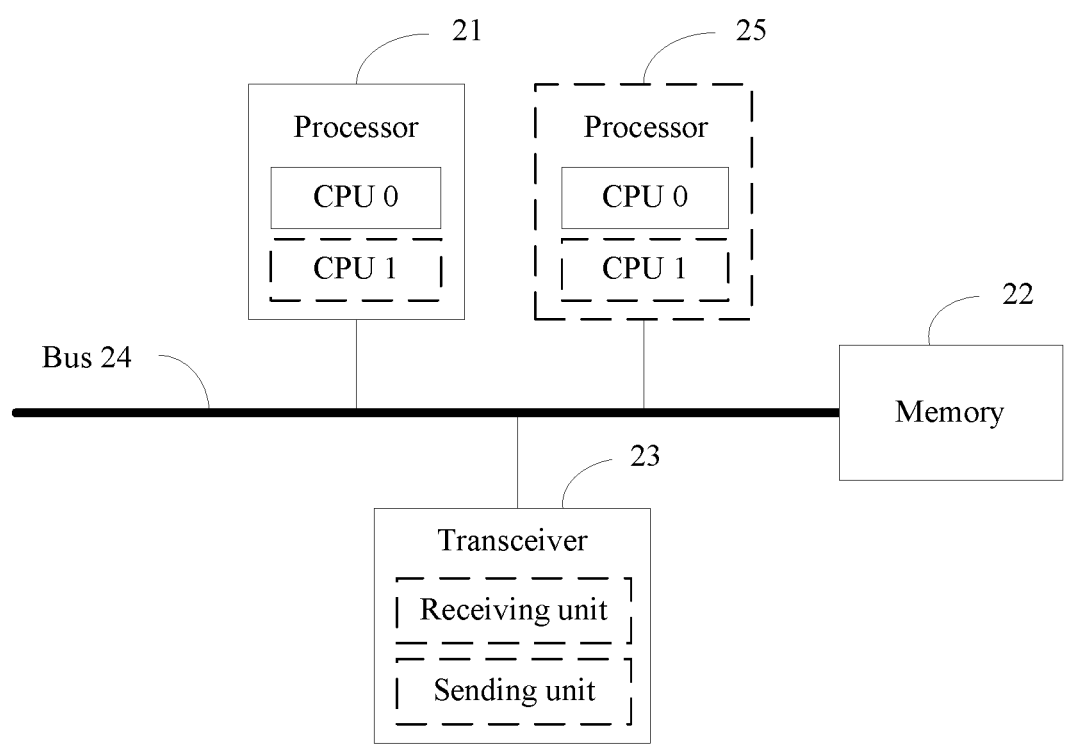
FIG. 2 is a schematic composition diagram of a base station according to an embodiment of the present invention.

FIG. 2 is a schematic composition diagram of a base station according to an embodiment of the present invention. As shown in FIG. 2, the base station may include at least one processor 21, a memory 22, a transceiver 23, and a bus 24.

The components of the base station are described below in detail with reference to FIG. 2.

The processor 21 is a control center of the base station, and may be a processor, or may be a general name of a plurality of processing elements. For example, the processor 21 is a central processing unit (central processing unit, CPU), or may be an application-specific integrated circuit (application-specific integrated circuit, ASIC), or may be configured as one or more integrated circuits implementing this embodiment of the present invention, for example, one or more microprocessors (digital signal processor, DSP) or one or more field programmable gate arrays (field programmable gate array, FPGA).

The processor 21 may perform various functions of the base station by running or executing a software program stored in the memory 22 and by invoking data stored in the memory 22.

In specific implementation, in an embodiment, the processor 21 may include one or more CPUs, for example, a CPU 0 and a CPU 1 shown in FIG. 2.

In specific implementation, in an embodiment, the base station may include a plurality of processors, for example, the processor 21 and a processor 25 shown in FIG. 2. Each of the processors may be a single-core processor (single-CPU), or may be a multi-core processor (multi-CPU). The processor herein may be one or more devices, a circuit, and/or a processing core used for processing data (such as a computer program instruction).

The memory 22 may be a read-only memory (read-only memory, ROM) or another type of static storage device that can store static information and an instruction, or a random access memory (random access memory, RAM) or another type of dynamic storage device that can store information and an instruction, or may be an electrically erasable programmable read-only memory (electrically erasable programmable read-only memory, EEPROM), a compact disc read-only memory (compact disc read-only memory, CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer, but is not limited thereto. The memory 22 may exist independently, and is connected to the processor 21 by using the bus 24. Alternatively, the memory 22 may be integrated with the processor 21.

The memory 22 is configured to store a software program for executing the solutions in the present invention, and the software program is controlled and executed by the processor 21.

The transceiver 23 is configured to communicate with another device or a communications network such as the Ethernet, a RAN, or a wireless local area network (wireless local area network, WLAN). The transceiver 23 may include a receiving unit for implementing a receiving function and a sending unit for implementing a sending function.

The bus 24 may be an industry standard architecture (industry standard architecture, ISA) bus, a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 2, but this does not mean that there is only one bus or only one type of bus.

The device structure shown in FIG. 2 constitutes no limitation on a first base station, and the first base station may include more or fewer components than those shown in the figure, or combine some components, or have different component arrangements.

In this embodiment of the present invention, the first base station may send a first message to a second base station, to instruct the second base station to separately report resource statuses for different service classifications. In this way, the first base station can perform a refined RRM operation such as load control or load balancing on different services based on resource statuses corresponding to different service classifications.

In specific implementation, the first base station may instruct, in the following two manners, the second base station to separately report resource statuses for different service classifications:

Manner 1: The first message carries a service classification identifier of a service whose resource status needs to be reported.

Manner 2: The first message carries indication information used to instruct to separately report resource statuses based on different service classifications.

In embodiments shown in FIG. 3A, FIG. 3B, FIG. 4A, and FIG. 4B, the embodiments of the present invention are described in detail based on specific different manners of instructing a second base station to separately report resource statuses for different service classifications.

Figure 3A:
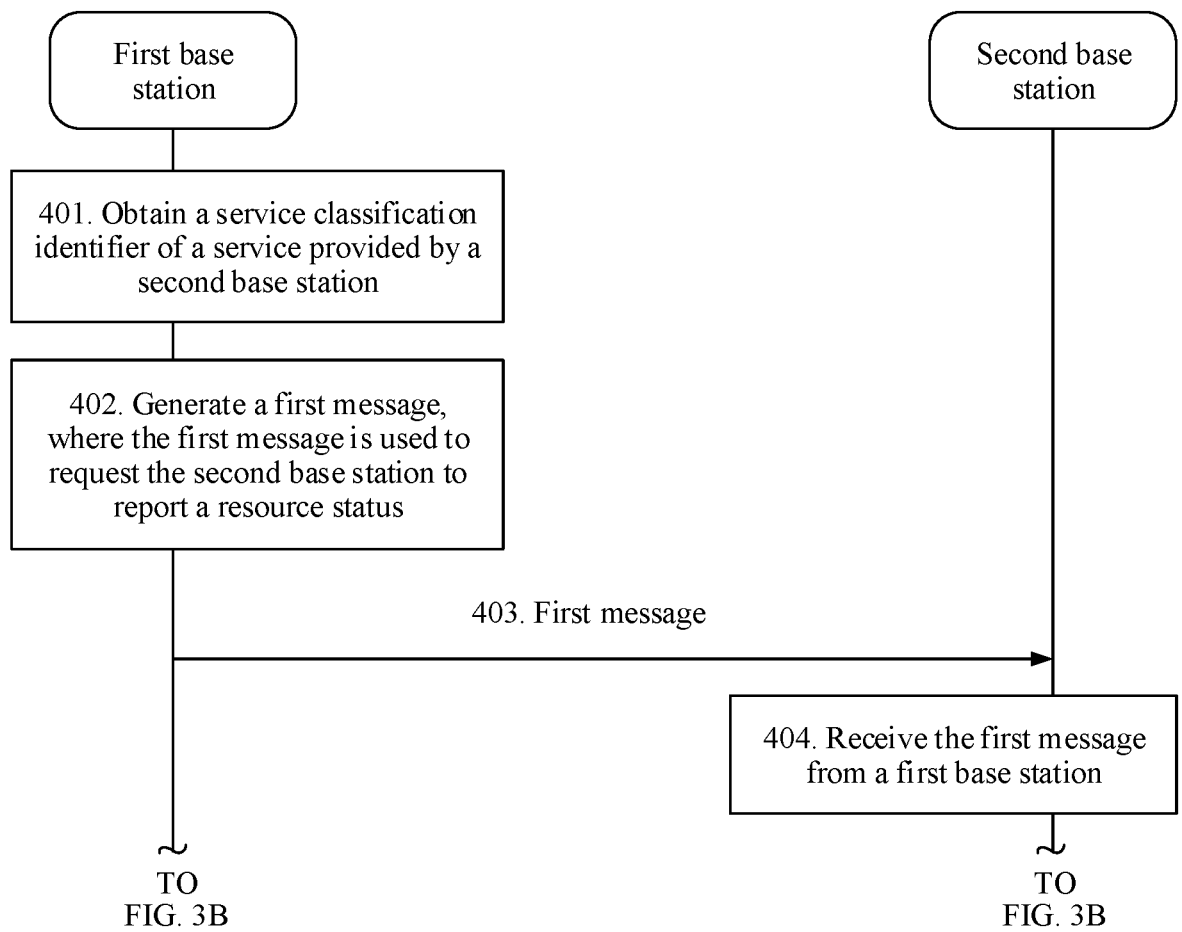
FIG. 3A and FIG. 3B are a flowchart of a resource status information transmission method according to an embodiment of the present invention.
Figure 3B:
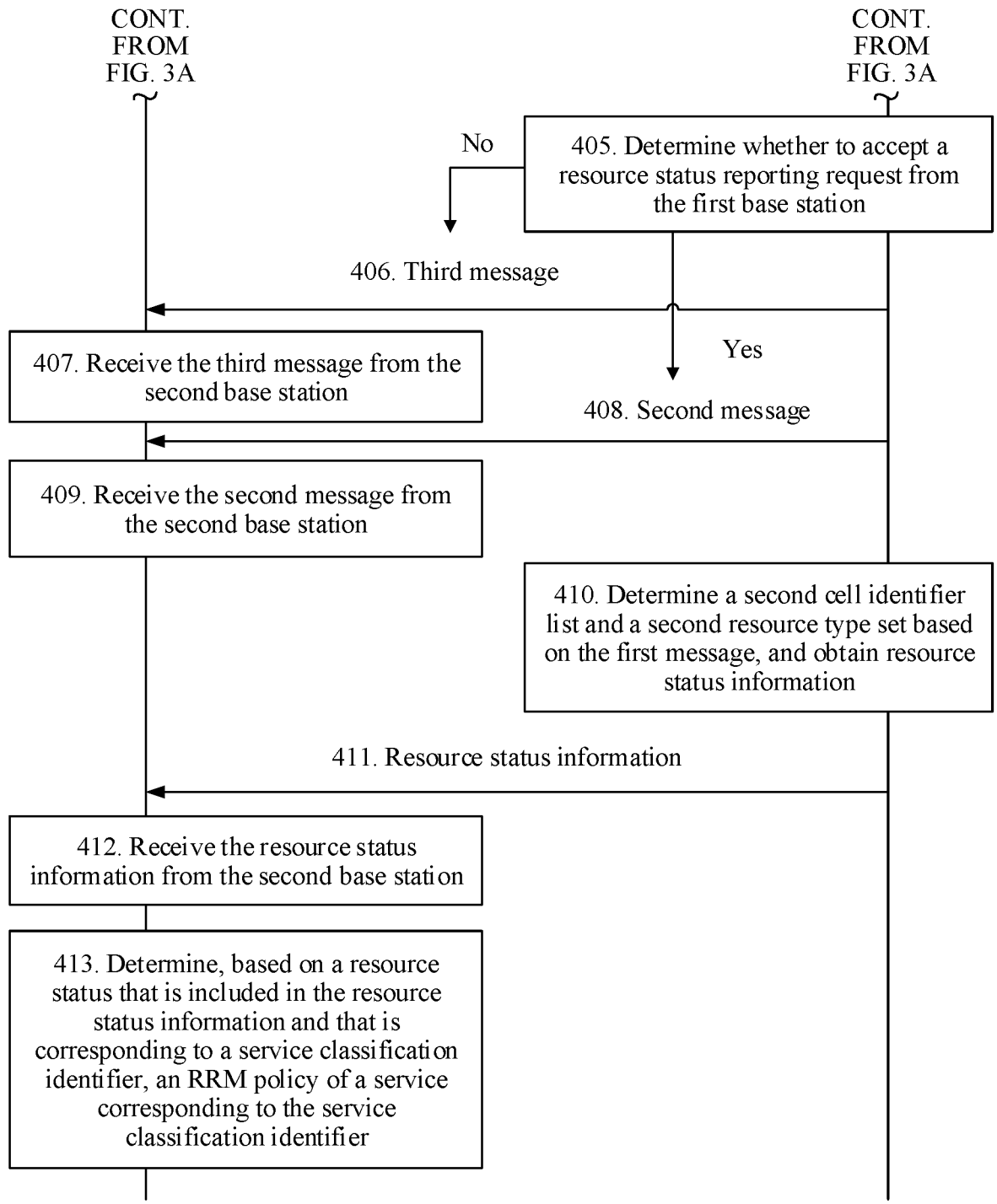

FIG. 3A and FIG. 3B are a flowchart of a resource status information transmission method according to an embodiment of the present invention. In this embodiment of the present invention, the resource status information transmission method provided in this embodiment of the present invention is described in detail by using an example in which a first base station adds, to a first message, a service classification identifier of a service whose resource status needs to be reported. As shown in FIG. 3A and FIG. 3B, the method may include the following steps.

401. The first base station obtains a service classification identifier of a service provided by a second base station.

In specific implementation, services provided by a base station may be classified based on different service types, or the services provided by the base station may be classified based on different slices. In a scenario in which services provided by a base station are classified based on different service types, the service classification identifier is a service type identifier. In a scenario in which services provided by a base station are classified based on different slices, the service classification identifier is slice identification information. The first base station may obtain, by exchanging service information with the second base station, the service classification identifier of the service provided by the second base station.

For example, in the scenario in which services provided by a base station are classified based on different service types, the first base station may obtain, by exchanging one or more of information about a capability of supporting different service types and a service type of a service provided by the second base station with the second base station, a service type identifier of a service provided by the second base station. For example, the service type identifier that is of the service provided by the second base station and that is obtained by the first base station includes an identifier of an eMBB service, an identifier of an mMTC service, and an identifier of a URLLC service.

In specific implementation, the service type identifier may include at least one of: several QoS parameters in a QoS parameter set, a QoS parameter set index value, a group identifier of a group in which a QoS parameter set index value is located, and the like. A QoS parameter set of a service may include at least one of a latency, a packet loss rate, a bit error rate, a priority, a maximum rate, a guaranteed rate, an allocation and retention priority, and the like. The QoS parameter set may be represented by using an index value. A correspondence between a QoS parameter set and an index value is configured in a standard protocol, or is configured by a network element and is transferred between network elements by using signaling. In addition, a plurality of index values may be grouped into several groups, different groups are corresponding to different types of services, and each group may be represented by using one group identifier. For example, an eMBB service may be represented by using a group identifier, the eMBB service may include a plurality of services, and each service in the eMBB service may be represented by using one index value.

In the scenario in which services provided by a base station are classified based on different slices, the first base station may obtain, by exchanging slice information with the second base station, slice identification information of the service provided by the second base station. The slice information may include information used to indicate whether a slice is supported. If the information used to indicate whether a slice is supported indicates that a slice is supported, the slice information further includes identification information of a supported slice. The slice identification information includes at least one of the following: a slice identifier (id), a slice type (type), a tenant type, a tenant identifier, a network function identifier, and the like. In specific implementation, the slice identification information may be used to indicate that a slice is supported. The slice is a network slice, and the network slice is a logical network function combination that meets a communications service requirement in a specific use case. The network slice helps an operator provide a service-based network architecture by using a logical resource rather than a physical resource. In such a network service, a resource and a requirement can be allocated and reallocated, an independent network function module is scalable, physical and virtual functions are flexibly deployed, and a service performance requirement is met while a network resource is fully and efficiently utilized.

After the first base station obtains the service classification identifier of the service provided by the second base station, the first base station may determine, based on a resource status of the first base station, a service whose resource status needs to be reported, to determine a service classification identifier that needs to be carried in a first message. For example, in the scenario in which services provided by a base station are classified based on different service types, it is assumed that the service provided by the second base station includes an eMBB service, an mMTC service, and a URLLC service, and the first base station has only an eMBB service. In this case, the first base station may add only an identifier of the eMBB service to the first message. For another example, the first base station has a plurality of types of services, but needs to perform a load balancing operation only on an mMTC service and a URLLC service. In this case, the first base station may add only identifiers of the mMTC service and the URLLC service to the first message.

402. The first base station generates a first message, where the first message is used to request the second base station to report a resource status.

The first message may be a resource status request. The first message may include a service classification identifier, a first cell identifier list, and a first resource type set.

The service classification identifier may include a service classification identifier of the service whose resource status needs to be reported and that is determined by the first base station. For example, in the scenario in which services provided by a base station are classified based on different service types, the service classification identifier includes the identifier of the mMTC service and the identifier of the URLLC service.

The first resource type set includes a type of a resource whose resource status needs to be reported. For example, the first resource type set may include at least one of the following resources: a PRB, a transport network layer (transport network layer, TNL), hardware (hardware, HW), a composite available capacity (Composite Available Capacity), an almost blank subframe status (almost blank subframe status, ABS status), reference signal received power (reference signal received power, RSRP), and channel state information (channel state information, CSI).

The first cell identifier list includes an identifier of a cell whose resource status needs to be reported.

Optionally, the first message may further include at least one of the following: a reporting period, a reporting start indication, and a reporting end indication. The reporting period is used to indicate a period of resource status reporting; the reporting start indication is used to indicate that the resource status reporting starts; and the reporting end indication is used to indicate that the resource status reporting ends. In addition, at least one of different reporting periods, different reporting start indications, and different reporting end indications may be used for different resource types in the first resource type set. For example, a reporting period corresponding to the PRB is different from a reporting period corresponding to the TNL.

Optionally, after the first base station obtains the service classification identifier of the service provided by the second base station, and determines the service classification identifier that needs to be carried in the first message, the first base station may configure the first message based on different configurations of the service classification identifier, so as to generate the first message. For example, the first message includes the service classification identifier, the first cell identifier list, the first resource type set, the reporting period, the reporting start indication, and the reporting end indication. In this case, the first base station may configure, for different service classification identifiers, at least one of different types of resources whose resource status needs to be reported, different identifiers of cells whose resource status needs to be reported, different reporting periods, different reporting start indications, and different reporting end indications. For example, in the scenario in which services provided by a base station are classified based on different service types, the service classification identifier carried in the first message includes the identifier of the mMTC service and the identifier of the URLLC service. In this case, different types of resources whose resource status needs to be reported and different reporting periods may be configured for the mMTC service and the URLLC service, and a same or different configurations are used for other parameters.

For example, in the scenario in which services provided by a base station are classified based on different service types, in the first message, the service classification identifier includes the identifier of the mMTC service and the identifier of the URLLC service, types that are of resources whose resource status needs to be reported and that are corresponding to the identifier of the mMTC service are the PRB and the TNL, types that are of resources whose resource status needs to be reported and that are corresponding to the identifier of the URLLC service are the HW and the CSI, identifiers that are of cells whose resource status needs to be reported and that are corresponding to both the identifier of the mMTC service and the identifier of the URLLC service are a cell 1, a cell 2, a cell 3, and a cell 5, a reporting period corresponding to the identifier of the mMTC service is 10 ms, and a reporting period corresponding to the identifier of the URLLC service is 5 ms.

Certainly, the first base station may configure a same type of resource whose resource status needs to be reported, a same identifier of cell whose resource status needs to be reported, a same reporting period, a same reporting start indication, and a same reporting end indication for all service classification identifiers.

For example, if services provided by a base station are classified based on different service types, in the first message, the service classification identifier includes the identifier of the mMTC service and the identifier of the URLLC service, the first resource type set includes the PRB, the TNL, the HW, and the CSI, the first cell identifier list includes a cell 1, a cell 2, a cell 3, and a cell 5, and the first message further includes a reporting period 10 ms.

403. The first base station sends the first message to the second base station.

404. The second base station receives the first message from the first base station.

405. The second base station determines whether to accept a resource status reporting request from the first base station.

After receiving the first message, the second base station may determine whether to accept the resource status reporting request from the first base station. If the second base station determines that the resource status reporting request from the first base station cannot be accepted, the following step 406 is performed; or if the second base station determines to accept the resource status reporting request from the first base station, the following steps 407 to 413 are performed.

406. The second base station sends a third message to the first base station.

The third message is used to indicate that a resource status cannot be reported.

When the second base station determines that the resource status reporting request from the first base station cannot be accepted, in other words, determines that none of services, resources whose resource status needs to be reported, and cells whose resource status needs to be reported can be accepted, the second base station may send resource status failure information, namely, the third message, to the first base station, to notify the first base station that a resource status cannot be reported.

The third message may include at least one of the following: a service classification identifier set, a failed cell identifier list, a type that is of a resource whose resource status cannot be reported and that is corresponding to a cell identifier included in the failed cell identifier list, and a cause that leads to a failure in reporting a resource status and that is corresponding to the cell identifier included in the failed cell identifier list. The service classification identifier set may include a service classification identifier of a service whose resource status cannot be reported. The failed cell identifier list may include an identifier that is of a cell whose resource status cannot be reported and that is in the first cell identifier list. The failure cause includes one of an unsupported measurement target, an unsupported target service type, an unsupported target base station, and the like.

407. The first base station receives a third message from the second base station.

After the first base station receives the third message, the first base station may determine whether to send the first message again. For example, the first base station may determine, based on the failure cause carried in the third message, whether to send the first message again. The first base station may further determine, based on the failure cause carried in the third message, to send the first message to a base station other than the second base station. In addition, the first base station may use the second base station as a low-priority target base station that initiates an RRM operation such as a handover or load balancing.

408. The second base station sends a second message to the first base station.

When the second base station determines to accept the resource status reporting request from the first base station, in other words, determines to accept some or all services, and/or some or all resources whose resource status needs to be reported, and/or some or all cells whose resource status needs to be reported, the second base station may send a resource status response, namely, the second message, to the first base station, to notify the first base station of services, and/or cells, and/or resources whose resource status is to be reported.

The second message may include at least one of the following: a second cell identifier list and a second resource type set. The second cell identifier list may include an identifier that is of a cell whose resource status can be reported and that is in the first cell identifier list. The second resource type set may include a type that is of a resource whose resource status can be reported and that is in the first resource type set.

Optionally, the second message may further include at least one of the following: a service classification identifier set, a failed cell identifier list, a type that is of a resource whose resource status cannot be reported and that is corresponding to a cell identifier included in the failed cell identifier list, and a cause that leads to a failure in reporting a resource status and that is corresponding to the cell identifier included in the failed cell identifier list. The failure cause includes one of an unsupported measurement target, an unsupported target service type, an unsupported target base station, and the like. The service classification identifier set includes a service type identifier for which a measurement request fails.

409. The first base station receives the second message from the second base station.

410. The second base station determines a second cell identifier list and a second resource type set based on the first message, and obtains resource status information.

The resource status information includes a service classification identifier and a resource status corresponding to the service classification identifier.

After the second base station determines to accept the resource status reporting request from the first base station, the second base station may obtain a resource status of a service corresponding to the service classification identifier, to obtain the resource status information.

For example, the second base station may first determine, based on the service classification identifier, the first cell identifier list, and the first resource type set that are carried in the first message, services, cells, and resources in the cells whose resource status can be reported, in other words, may determine the second cell identifier list and the second resource type set, and then separately collect, based on the service classification identifier, statistics on resource statuses corresponding to all service classification identifier for the cells on which statistics need to be collected and the resources that are in the cells and on which statistics need to be collected. For example, in the scenario in which services provided by a base station are classified based on different service types, in the first message, the service classification identifier includes the identifier of the mMTC service and the identifier of the URLLC service, the first resource type set includes the PRB, the TNL, the HW, and the CSI, and the first cell identifier list includes the cell 1, the cell 2, the cell 3, and the cell 5. In addition, the second base station determines that a resource status may be reported for the PRB and TNL resources in the cell 1 and the HW and CSI resources in the cell 3 for the mMTC service, and a resource status may be reported for the TNL, HW, and CSI resources in the cell 5 for the URLLC service. In this case, the second base station may collect statistics on the PRB and TNL resources in the cell 1 and the HW and CSI resources in the cell 3 for the mMTC service, to obtain a resource status corresponding to the identifier of the mMTC service. In addition, the second base station may collect statistics on the TNL, HW, and CSI resources in the cell 5 for the URLLC service, to obtain a resource status corresponding to the identifier of the URLLC service.

Certainly, when the first base station configures, for different service classification identifiers, at least one of different types of resources whose resource status needs to be reported, different identifiers of cells whose resource status needs to be reported, different reporting periods, different reporting start indications, and different reporting end indications, the second base station may collect, based on different configurations, statistics on resource statuses corresponding to the different service classification identifiers.

411. The second base station sends the resource status information to the first base station.

If the first message received by the second base station includes at least one of the reporting period, the reporting start indication, and the reporting end indication, the second base station may send the resource status information to the first base station based on the reporting period, and/or the reporting start indication, and/or the reporting end indication included in the first message.

In this embodiment of the present invention, the resource status that is corresponding to each service classification identifier and that is included in the resource status information may be separately reported based on different resource types. In other words, the resource status corresponding to each service classification identifier may specifically include at least one of the following: a resource status of the PRB, a resource status of the TNL, a resource status of the HW, a resource status of the composite available capacity, a resource status of the ABS status, a resource status of the RSRP, and a resource status of the CSI.

The resource status of the PRB is utilization of the PRB in a cell.

The resource status of the TNL is load information of bandwidth at a transport layer between a base station and a core network interface, and the load information may be a low load (Low Load), a medium load (Medium Load), a high load (High Load), or overload (Overload).

The resource status of the HW is a hardware resource status of a cell, and may be a low load, a medium load, a high load, or overload.

The resource status of the composite available capacity is a service capacity that can be accommodated in a cell, and may include two parts: a total service capacity of the cell and an available proportion of the total service capacity of the cell.

The resource status of the ABS status indicates a proportion of used almost blank subframes in a cell.

The resource status of the RSRP indicates reference signal received power of several cells that is measured by UE in the second base station.

The resource status of the CSI indicates channel statuses of several cells that are measured by the UE in the second base station.

In addition, each of the foregoing resource statuses may include an uplink resource status and a downlink resource status.

412. The first base station receives the resource status information from the second base station.

413. The first base station determines, based on the resource status that is included in the resource status information and that is corresponding to the service classification identifier, an RRM policy of a service corresponding to the service classification identifier.

After the first base station receives the resource status information reported by the second base station, the first base station may learn load statuses of different services based on resource statuses corresponding to different service classification identifiers. In this way, load balancing policies of the different services can be determined based on the load statuses of the different services, and therefore an RRM operation such as a handover, load balancing, or load control can be precisely initiated for the different services. For example, a capacity that is of a service whose service type is the mMTC service and that can be accommodated in a cell of the second base station may be learned, and therefore a load balancing operation is performed on a service whose service type is the mMTC service.

It should be noted that, in this embodiment of the present invention, in the scenario in which services provided by a base station are classified based on different slices, the service classification identifier included in the first message is the slice identification information, and the second base station that receives the first message may separately collect statistics on and report a resource status based on the slice identification information. Specific implementation steps are similar to detailed description of corresponding steps of separately collecting statistics on and reporting a resource status based on the service type in this embodiment. Details are not described herein in this embodiment of the present invention.

In addition, in this embodiment of the present invention, optionally, after receiving the first message from the first base station, the second base station may retain a configuration in the first message, for example, retain the service classification identifier, the first cell identifier list, the first resource type set, the reporting period, the reporting start indication, and the reporting end indication that are carried in the first message. Further, after receiving a fourth message from the first base station, the second base station may activate the retained configuration, and collect statistics on and report a resource status. The fourth message may be an independent resource status request activation message, or another used message, for example, a used handover request message.

It should be noted that, in this embodiment of the present invention, the first base station and the second base station may be base stations in a same system, or may be base stations in different systems. The first base station and the second base station may transmit signaling by using a direct interface between the base stations or by using an indirect interface.

According to the resource status information transmission method provided in this embodiment of the present invention, the first base station receives, from the second base station, the resource status information that includes the service classification identifier and the resource status corresponding to the service classification identifier. In this way, the first base station can learn load statuses of different services based on resource statuses corresponding to different service classification identifiers, and therefore can precisely initiate an RRM operation such as a handover, load balancing, or load control based on the load statuses of the different services, thereby implementing a refined RRM operation at a service level, and improving network utilization and user experience.

Figure 4A:
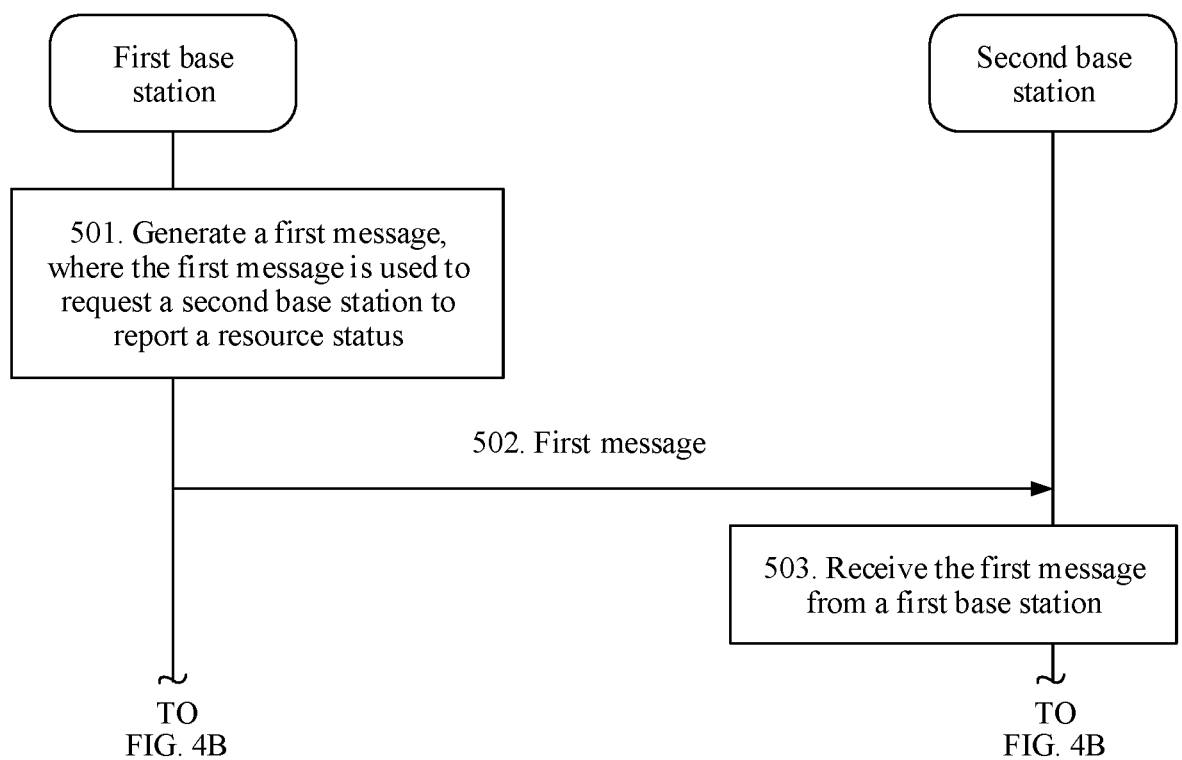
FIG. 4A and FIG. 4B are a flowchart of another resource status information transmission method according to an embodiment of the present invention.
Figure 4B:
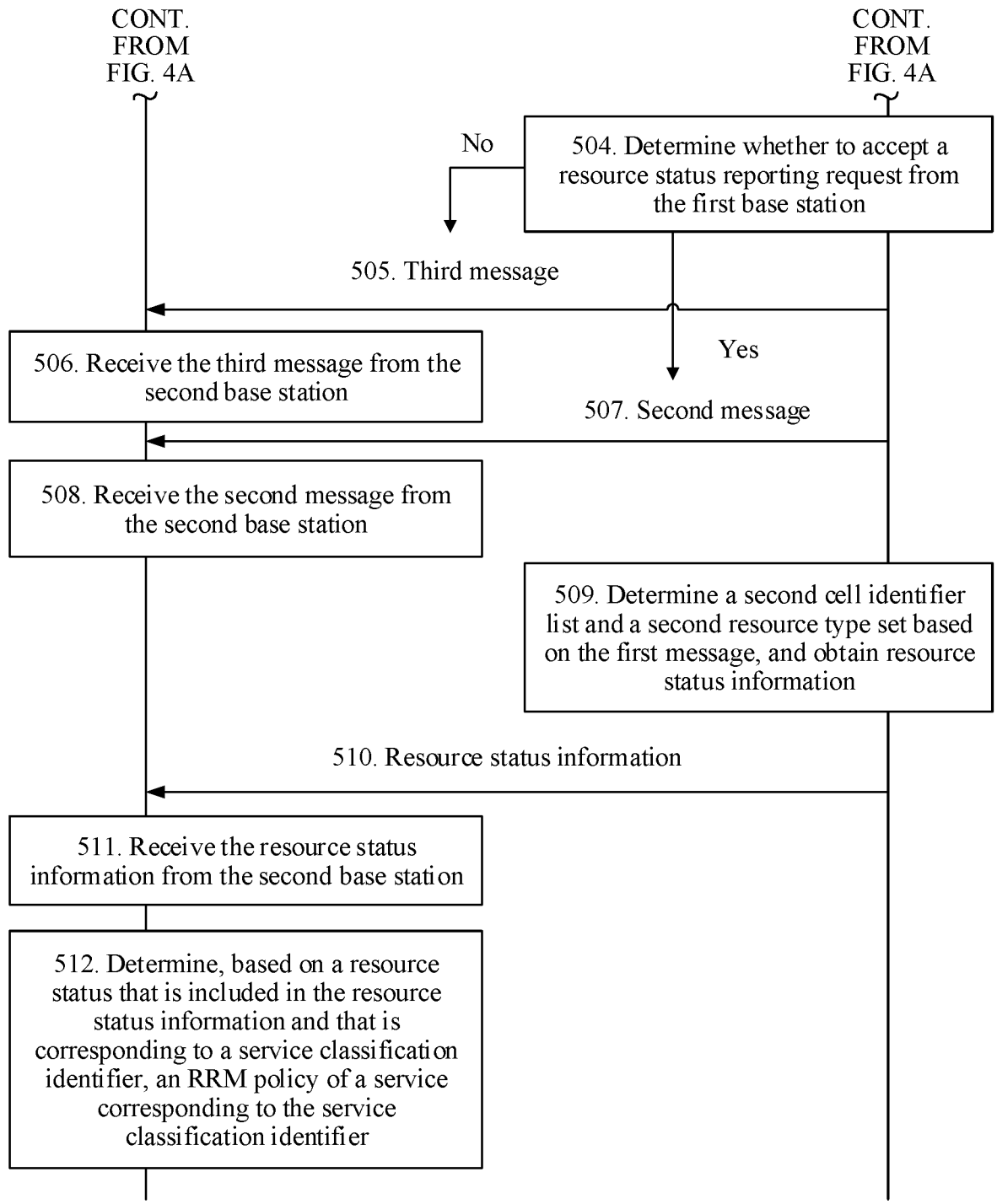

FIG. 4A and FIG. 4B are a flowchart of another resource status information transmission method according to an embodiment of the present invention. In this embodiment of the present invention, the resource status information transmission method provided in this embodiment of the present invention is described in detail by using an example in which a first base station adds, to a first message, indication information used to instruct to separately report resource statuses based on different service classifications. As shown in FIG. 4A and FIG. 4B, the method may include the following steps.

501. The first base station generates a first message, where the first message is used to request a second base station to report a resource status.

The first message may include indication information, a first cell identifier list, and a first resource type set. The indication information is used to instruct the second base station to separately report resource statuses based on different service classifications.

In another implementation, if the first message does not include the indication information used to instruct the second base station to separately report resource statuses based on different service classifications, a base station (for example, the second base station) that receives the first message may separately report resource statuses based on different service classifications by default.

Optionally, the first message may further include at least one of the following: a reporting period, a reporting start indication, and a reporting end indication.

502. The first base station sends the first message to the second base station.

503. The second base station receives the first message from the first base station.

504. The second base station determines whether to accept a resource status reporting request from the first base station.

After receiving the first message, the second base station may determine whether to accept the resource status reporting request from the first base station. If the second base station determines that the resource status reporting request from the first base station cannot be accepted, the following step 505 is performed; or if the second base station determines to accept the resource status reporting request from the first base station, the following steps 506 to 512 are performed.

505. The second base station sends a third message to the first base station.

The third message is used to indicate that a resource status cannot be reported.

506. The first base station receives a third message from the second base station.

507. The second base station sends a second message to the first base station.

508. The first base station receives the second message from the second base station.

509. The second base station determines a second cell identifier list and a second resource type set based on the first message, and obtains resource status information.

The resource status information includes a service classification identifier and a resource status corresponding to the service classification identifier.

After the second base station determines to accept the resource status reporting request from the first base station, the second base station may determine the second cell identifier list and the second resource type set based on the first message, and obtain, based on different service classifications of the second base station, a resource status of a service corresponding to the service classification identifier, so as to obtain the resource status information.

For example, the second base station may first determine, based on a service classification supported by the second base station, cells and resources in the cells whose resource status can be reported and that are in the first cell identifier list and the first resource type set included in the first message, in other words, may determine the second cell identifier list and the second resource type set, and then separately collect, based on different supported service classifications, statistics on resource statuses corresponding to all services classification identifiers for the cells on which statistics need to be collected and the resources that are in the cells and on which statistics need to be collected. For example, in a scenario in which services provided by a base station are classified based on different service types, the second base station supports an mMTC service, the first resource type set includes a PRB, a TNL, HW, and CSI, and the first cell identifier list includes a cell 1, a cell 2, a cell 3, and a cell 5. In addition, the second base station determines that a resource status may be reported for the TNL, HW, and CSI resources in the cell 5 for the mMTC service. In this case, the second base station may collect statistics on the TNL, HW, and CSI resources in the cell 5 for the mMTC service, to obtain a resource status corresponding to an identifier of the mMTC service. For another example, in a scenario in which services provided by a base station are classified based on different slices, the second base station separately collects, based on different slices supported by the second base station, resource statuses corresponding to the different slices.

510. The second base station sends the resource status information to the first base station.

511. The first base station receives the resource status information from the second base station.

512. The first base station determines, based on a resource status that is included in the resource status information and that is corresponding to a service classification identifier, an RRM policy of a service corresponding to the service classification identifier.

It should be noted that, in this embodiment of the present invention, the first base station and the second base station may be base stations in a same system, or may be base stations in different systems. The first base station and the second base station may transmit signaling by using a direct interface between the base stations or by using an indirect interface.

It should be noted that detailed description of step 501 to step 512 in this embodiment of the present invention are similar to corresponding detailed description of step 401 to step 413 in another embodiment of the present invention. For the detailed description of step 501 to step 512 in this embodiment of the present invention, refer to the corresponding detailed description of step 401 to step 413 in the another embodiment of the present invention. Details are not described herein in this embodiment of the present invention.

According to the resource status information transmission method provided in this embodiment of the present invention, the first base station receives, from the second base station, the resource status information that includes the service classification identifier and the resource status corresponding to the service classification identifier. In this way, the first base station can learn load statuses of different services based on resource statuses corresponding to different service classification identifiers, and therefore can precisely initiate an RRM operation such as a handover, load balancing, or load control based on the load statuses of the different services, thereby implementing a refined RRM operation at a service level, and improving network utilization and user experience.

In addition, in the embodiments shown in FIG. 3A, FIG. 3B, FIG. 4A, and FIG. 4B, when the first resource type set includes the PRB, the resource status information transmission method provided in the embodiments of the present invention may further include: sending, by the second base station to the first base station, type information of all or some PRBs in a cell managed by the second base station. The type information of the PRB is a numerology type corresponding to the PRB. If numerology types are different, PRBs are corresponding to different time domain resources and frequency domain resources, for example, different carrier bandwidth, different transmission time interval (transmission time interval, TTI) lengths, and different quantities of symbols in a subframe are used. In this embodiment of the present invention, different PRB types may be represented by using different index values. The second base station may send the type information of all the or some PRBs in the cell managed by the second base station to the first base station by using the resource status information, or may send the type information of all the or some PRBs in the cell managed by the second base station to the first base station by using another independent message.

Further, optionally, in a first possible implementation, the second base station may send mode information of all the PRBs in the cell managed by the second base station to the first base station. The mode information of PRBs refers to a distribution mode, in time domain and/or frequency domain, of PRBs of various types in the cell managed by the second base station. The second base station may send the mode information of all the PRBs in the cell managed by the second base station to the first base station by using the resource status information (specifically, may add the mode information of a PRB to a resource status of the PRB that is included in the resource status information). Alternatively, the second base station may send the mode information of all the PRBs in the cell managed by the second base station to the first base station by using another message between base stations.

In a second possible implementation, the second base station may send information about a quantity of PRBs in the cell managed by the second base station to the first base station. The information about the quantity of PRBs is also used to indicate a distribution mode, in time domain and/or frequency domain, of PRBs of various types in the cell managed by the second base station. There may be different quantities of PRBs for different numerology types.

Figure 5:
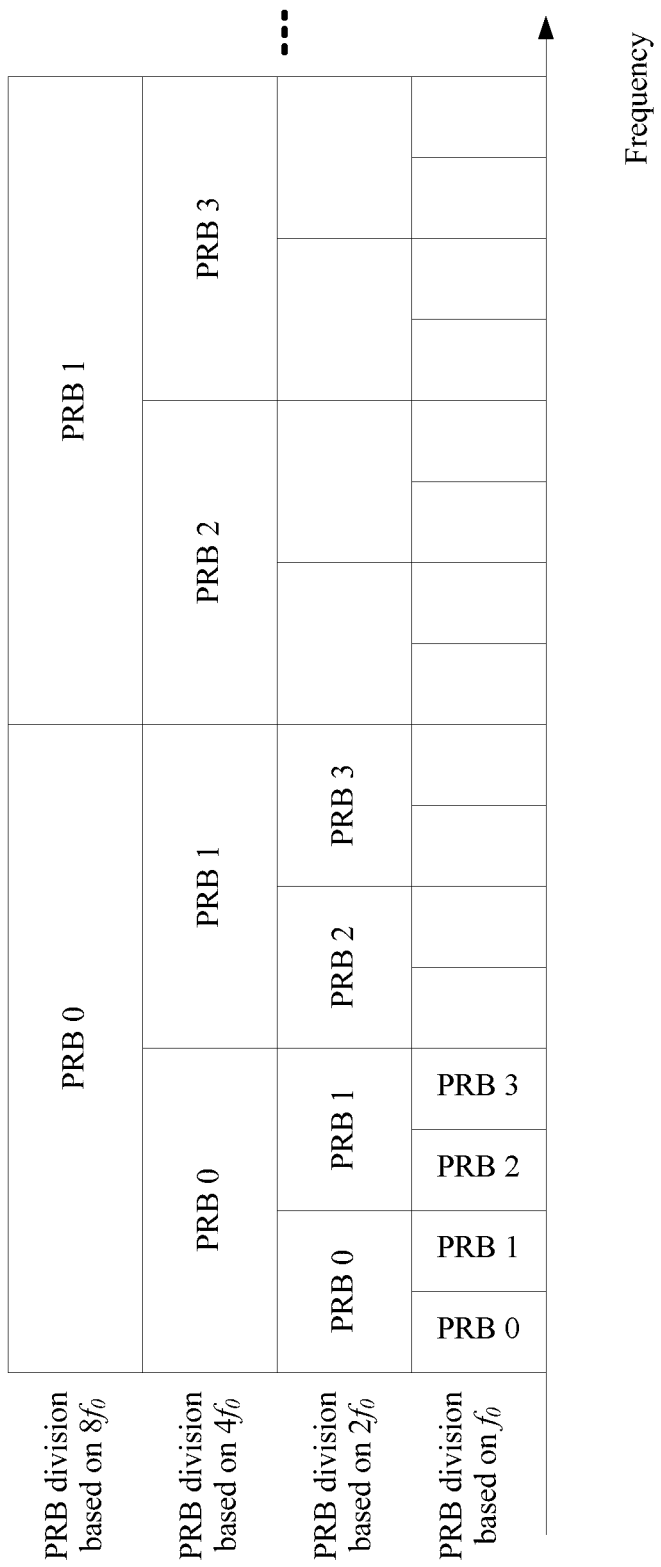
FIG. 5 is a schematic diagram of distribution, in frequency domain, of PRBs of various types in a cell managed by a second base station according to an embodiment of the present invention.

For example, in specific implementation, it is assumed that distribution, in frequency domain, of the PRBs of various types in the cell managed by the second base station is shown in FIG. 5. To be specific, one PRB occupies a maximum width in frequency domain, and there are different quantities of PRBs of other types in frequency domain, so that widths of the PRBs are the same in frequency domain. Specifically, as shown in FIG. 5, 8 $f_o$ is used as a reference, there are two 4 $f_o$ PRBs in frequency domain, and there are four 2 $f_0$ PRBs in frequency domain, where $f_0$ refers to a carrier width.

Corresponding to the type information, the mode information, or the quantity information that is of the PRBs in the cell managed by the second base station and that is sent by the second base station to the first base station, for PRBs whose quantity is greater than 1 in time domain, when the second base station collects statistics on resource statuses of the PRBs, the second base station may use a same statistical algorithms. For example, if several PRBs in a group of PRBs in time domain are used, it is considered that the group of PRBs are used. In this algorithm, resource statuses of the group of PRBs may be normalized to a resource usage status of a PRB with a maximum length in time domain. Correspondingly, in the resource status information, for the PRBs whose quantity is greater than 1 in time domain, the group of PRBs in time domain may be represented by using same resource status information. For another example, in a group of PRBs in time domain, statistics on usage of each PRB are independently collected. The group of PRBs in time domain is a group of PRBs aligned, in time domain, with a PRB with a maximum length in time domain.

Alternatively, for PRBs whose quantity is greater than 1 in frequency domain, when the second base station collects statistics on resource statuses of the PRBs, the second base station may use same statistical algorithms. For example, if several PRBs in a group of PRBs in frequency domain are used, it is considered that the group of PRBs are used. In this algorithm, resource statuses of the group of PRBs may be normalized to a resource usage status of a PRB with a maximum width in frequency domain. Correspondingly, in the resource status information, for the PRBs whose quantity is greater than 1 in frequency domain, the group of PRBs in frequency domain may be represented by using same resource status information. For another example, in a group of PRBs in frequency domain, statistics on usage of each PRB are independently collected. The group of PRBs in frequency domain is a group of PRBs aligned, in frequency domain, with a PRB with a maximum width in frequency domain.

Alternatively, a group of PRBs may use both a size granularity of a PRB in frequency domain and a size granularity of a PRB in time domain. To be specific, a size in time domain and a size in frequency domain that are corresponding to a group of PRBs in time-frequency domain are respectively the same as a size, in time domain, of a PRB with a maximum length in time domain and a size, in frequency domain, of a PRB with a maximum width in frequency domain. Correspondingly, in the resource status information, the group of PRBs in time-frequency domain may be represented by using normalized resource status information, or each PRB in the group of PRBs in time-frequency domain is represented by using independent resource status information.

In addition, the first base station may indicate, in the first message, a granularity for collecting statistics on a resource status of a PRB. The granularity for collecting statistics on a resource status of a PRB is a PRB unit that is used as a statistical reference when the second base station collects statistics on the resource status of the PRB. The PRB unit may be a PRB of a specific type or a PRB group of a specific type, for example, a PRB group that includes several PRBs of a specific type in time-frequency domain. In this way, the second base station may perform statistics collection and reporting based on the granularity that is for collecting statistics on a resource status of a PRB and that is indicated in the first message.

After receiving the resource status information, the first base station may perform an operation such as load control or load balancing based on the resource status of the PRB that is included in the resource status information, for example, based on a same or different resource statuses of a group of PRBs in time-frequency domain. Specifically, the first base station may perform an operation such as load control or load balancing based on the resource status of the PRB and the mode information of the PRBs in the target cell. For example, the first base station may determine, based on PRB modes in the target cell and the resource status of the PRB, to perform an appropriate operation such as load control or load balancing.

It should be noted that the measurement manner, the statistics collection manner, and the reporting manner of the resource status of the PRB in the second base station and the manner in which the first base station performs an operation such as load control or load balancing based on the resource status of the PRB may be used in a resource status information reporting scenario in which resource status information is distinguished based on a service type, and may be further used in a resource status information reporting scenario in which resource status information is not distinguished based on a service type. This is not specifically limited in this embodiment of the present invention.

Figure 6:
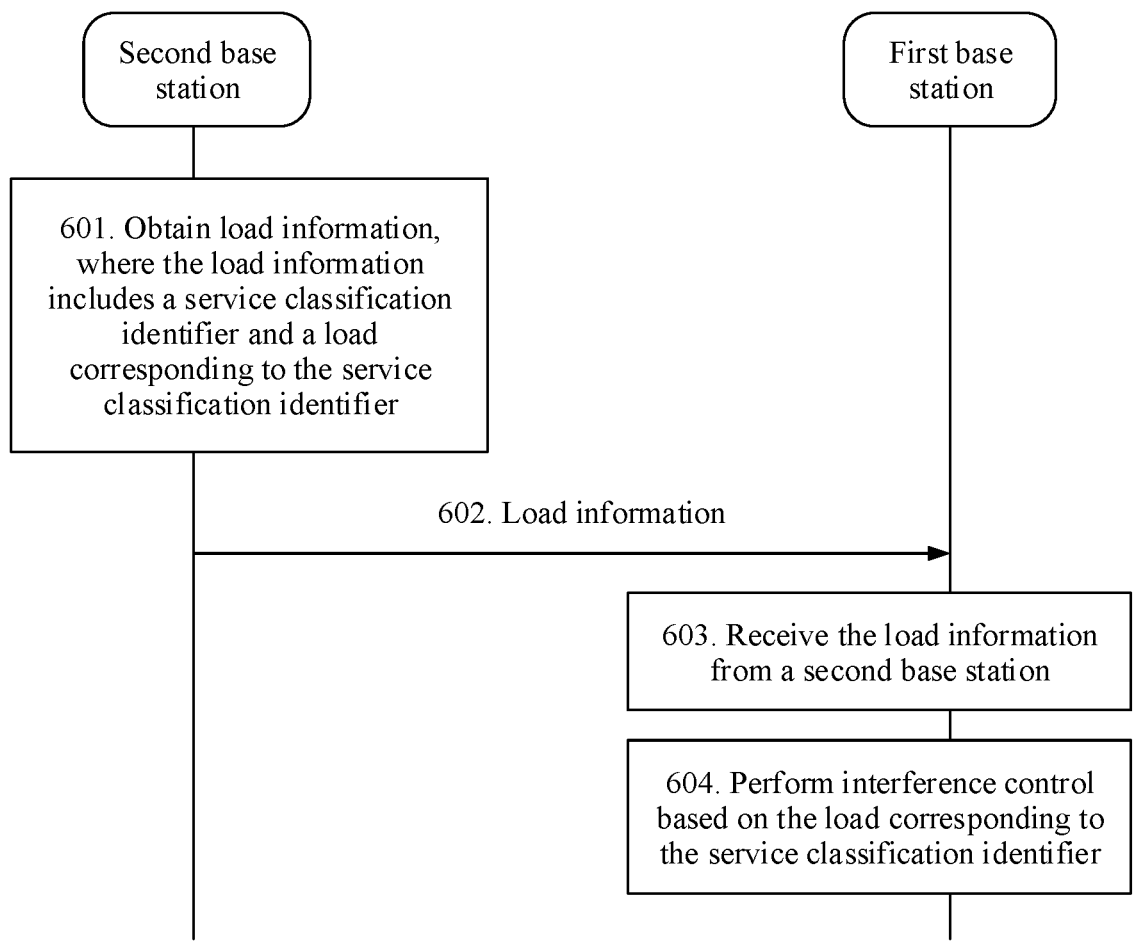
FIG. 6 is a flowchart of a load information transmission method according to an embodiment of the present invention.

FIG. 6 is a flowchart of a load information transmission method according to an embodiment of the present invention. As shown in FIG. 6, the method may include the following steps.

601. A second base station obtains load information, where the load information includes a service classification identifier and a load corresponding to the service classification identifier.

The service classification identifier is a service type identifier or slice identification information. The load includes at least one of a UL interference overload indication, RNTP, and UL high interference information.

The UL interference overload indication is used to indicate an interference load level of all PRBs in a cell. The interference load level may be classified into a high interference load level, a medium interference load level, and a low interference load level. The UL interference overload indication may be used in a scenario in which a load is relatively high. For example, when receiving a UL interference overload indication from a base station 2, a base station 1 may determine, based on the UL interference overload indication, whether interference is caused by the base station 1. If the interference is caused by the base station 1, the base station 1 may perform interference reduction processing based on PRB resource usage of the base station 2, for example, during resource scheduling, avoid scheduling a PRB resource that is in the base station 2 and that is subject to high interference.

RNTP is used to indicate whether transmit power of a downlink PRB of a cell exceeds a threshold.

The UL high interference information (HII) is an uplink high interference indication, and includes information about a PRB of high interference sensitivity for a neighboring cell. In the neighboring cell, the PRB of high sensitivity that is indicated in the HII is avoided as much as possible.

Further, for one or more target cells, a first base station may set corresponding PRBs to different interference sensitivity based on different service classifications, for example, may set a PRB used for a URLLC service to high interference sensitivity.

The second base station may obtain a load of each service classification based on different service classifications supported by the second base station.

It should be noted that for detailed description of the service type and the slice identification information in this embodiment of the present invention, refer to detailed description of corresponding content in step 401 in another embodiment of the present invention. Details are not described herein in this embodiment of the present invention.

602. The second base station sends the load information to a first base station.

603. The first base station receives the load information from the second base station.

604. The first base station performs interference control based on the load corresponding to the service classification identifier.

For example, for a URLLC service, the first base station may avoid, as much as possible, using a PRB used by the second base station to transmit the URLLC service, so as to reduce interference and ensure performance of the second base station.

For another example, when a PRB for an mMTC service in the second base station is subject to high interference, and the first base station is short of resources, a resource corresponding to the PRB resource used for the mMTC service may be scheduled in the first base station.

For another example, for a PRB in the second base station that is to be used for an mMTC service, when the first base station is short of resources, a resource corresponding to the PRB resource that is to be used for the mMTC service may be scheduled in the first base station.

In addition, in another embodiment of the present invention, the second base station may send priority information of all or some PRBs in a cell managed by the second base station to the first base station (the first base station is a base station surrounding the second base station). In this way, after receiving the priority information of all the or some PRBs in the cell managed by the second base station from the second base station, the first base station may determine resource usage of a cell of the first base station based on the priority information of all the or some PRBs in the cell managed by the second base station. The priority information of the PRBs may be corresponding to a service type, a subscriber level, or tenant information, for example, may be classified into three levels based on different service types: a high level, a medium level, and a low level. The first base station may attempt not to use, based on the priority information of all the or some PRBs in the cell managed by the second base station, a PRB with a high priority in the cell managed by the second base station, and use, at limited power, PRBs with a medium priority and/or a low priority in the cell managed by the second base station. In addition, the second base station may send the priority information of all the or some PRBs in the cell managed by the second base station to the first base station by using the load information, or may send the priority information of all the or some PRBs in the cell managed by the second base station to the first base station by using another independent message (for example, a first message). Further, the second base station may notify, periodically or in an event-based manner, the first base station of the priority information of all the or some PRBs in the cell managed by the second base station. For example, when determining that the second base station is in a high-load state or is subject to high interference, the second base station sends the priority information of all the or some PRBs in the cell managed by the second base station to the first base station.

In this embodiment of the present invention, the second base station may send type information of all the or some PRBs in the cell managed by the second base station to the first base station (the first base station is a base station surrounding the second base station). The type information of the PRB is a numerology type corresponding to the PRB. If numerology types are different, PRBs are corresponding to different time domain resources and frequency domain resources, for example, different carrier bandwidth, different TTI lengths, and different quantities of symbols in a subframe are used. In this embodiment of the present invention, different PRB types may be represented by using different index values. In this way, after receiving the type information of all the or some PRBs in the cell managed by the second base station from the second base station, the first base station may determine the resource usage of the cell of the first base station based on the type information of all the or some PRBs in the cell managed by the second base station. In addition, the second base station may send the type information of all the or some PRBs in the cell managed by the second base station to the first base station by using the load information, or may send the type information of all the or some PRBs in the cell managed by the second base station to the first base station by using another independent message.

Further, optionally, in a first possible implementation, the second base station may send mode information of all the PRBs in the cell managed by the second base station to the first base station (the first base station is a base station surrounding the second base station). The mode information of the PRBs refers to a distribution mode, in time domain and/or frequency domain, of PRBs of various types in the cell managed by the second base station. The second base station may send the mode information of all the PRBs in the cell managed by the second base station to the first base station by using the load information, or the second base station may send the mode information of all the PRBs in the cell managed by the second base station to the first base station by using another message between base stations.

In a second possible implementation, the second base station may send information about a quantity of PRBs in the cell managed by the second base station to the first base station. The information about the quantity of PRBs is also used to indicate a distribution mode, in time domain and/or frequency domain, of PRBs of various types in the cell managed by the second base station. There may be different quantities of PRBs for different numerology types.

For example, in specific implementation, it is assumed that distribution, in frequency domain, of the PRBs of various types in the cell managed by the second base station is shown in FIG. 5. To be specific, one PRB occupies a maximum width in frequency domain, and there are different quantities of PRBs of other types in frequency domain, so that widths of the PRBs are the same in frequency domain.

Specifically, for example, in FIG. 5, 8 $f_0$ is used as a reference, there are two 4 $f_0$ PRBs in frequency domain, and there are four 2 $f_0$ PRBs in frequency domain.

Corresponding to the type information, the mode information, or the quantity information that is of the PRBs in the cell managed by the second base station and that is sent by the second base station to the first base station, in the load information, for PRBs whose quantity is greater than 1 in time domain, a group of PRBs in time domain may be represented by using same load information. For example, if several PRBs in a group of PRBs in time domain have high RNTP, the group of PRBs all have high RNTP. In this case, load information of the group of PRBs may be normalized to load information of a PRB with a maximum length in time domain. Alternatively, for PRBs whose quantity is greater than 1 in time domain, each PRB in a group of PRBs in time domain is represented by using independent load information. The group of PRBs in time domain is a group of PRBs aligned, in time domain, with a PRB with a maximum length in time domain. In this way, after receiving the load information, the first base station may perform interference control based on same or different load information of a group of PRBs in time domain. For example, the first base station may perform resource scheduling based on different load information of PRBs, or perform resource scheduling based on same load information of a group of PRBs in time domain.

Alternatively, in the load information, for PRBs whose quantity is greater than 1 in frequency domain, a group of PRBs in frequency domain may be represented by using same load information. For example, if several PRBs in a group of PRBs in frequency domain have high RNTP, the group of PRBs all have high RNTP. In this case, load information of the group of PRBs may be normalized to load information of a PRB with a maximum width in frequency domain. Alternatively, for PRBs whose quantity is greater than 1 in frequency domain, each PRB in a group of PRBs in frequency domain is represented by using independent load information. The group of PRBs in frequency domain is a group of PRBs aligned, in frequency domain, with a PRB with a maximum width in frequency domain. In this way, after receiving the load information, the first base station may perform interference control based on same or different load information of a group of PRBs in frequency domain. For example, the first base station may perform resource scheduling based on different load information of PRBs, or perform resource scheduling based on same load information of a group of PRBs in frequency domain.

Alternatively, a group of PRBs may use both a size granularity of a PRB in frequency domain and a size granularity of a PRB in time domain. To be specific, a size in time domain and a size in frequency domain that are corresponding to a group of PRBs in time-frequency domain are respectively the same as a size, in time domain, of a PRB with a maximum length in time domain and a size, in frequency domain, of a PRB with a maximum width in frequency domain, in other words, the PRBs are aligned in both time domain and frequency domain. Correspondingly, in the load information, the group of PRBs in time-frequency domain may be represented by using same load information, or each PRB in the group of PRBs in time-frequency domain is represented by using independent load information. In this way, after receiving the load information, the first base station may perform interference control based on same or different load information of a group of PRBs in time-frequency domain. For example, the first base station may perform resource scheduling based on different load information of PRBs, or perform resource scheduling based on same load information of a group of PRBs in time-frequency domain.

In addition, the first base station may send, to the second base station, information used to indicate a PRB granularity for collecting cell load information. The PRB granularity for collecting the cell load information is a PRB unit that is used as a statistical reference when the second base station collects the cell load information. The PRB unit may be a PRB of a specific type or a PRB group of a specific type, for example, a PRB group that includes several PRBs of a specific type in time-frequency domain. In this way, the second base station may collect and report the load information based on the indicated PRB granularity for collecting the cell load information.

After receiving the load information, the first base station may perform scheduling based on the load information and the mode information of the PRBs in the target cell. For example, the first base station may determine, based on PRB modes in the target cell and the load information, to schedule a resource in an appropriate PRB mode, and schedule a PRB resource in the PRB mode based on the load information.

It should be noted that the solution in which a same or different PRB granularity is used for different types of PRBs during cell load information collection may be used in a scenario in which cell load information or a PRB priority is reported based on a service type and a scenario in which cell load information or load information of a PRB priority is reported without distinguishing between service types. This is not specifically limited in this embodiment of the present invention.

Further, in this embodiment of the present invention, the second base station reports the priority information of some PRBs in the managed cell, for example, may report only a PRB with a high priority or a low priority.

Numerology is a numerology in a communications technology, and specifically refers to a parameter configuration in the communications technology, such as a subcarrier spacing or a cyclic prefix format.

It should be noted that, in this embodiment of the present invention, the first base station and the second base station may be base stations in a same system, or may be base stations in different systems. The first base station and the second base station may transmit signaling by using a direct interface between the base stations or by using an indirect interface.

According to the load information transmission method provided in this embodiment of the present invention, the first base station receives, from the second base station, the load information that includes the service classification identifier and the load corresponding to the service classification identifier. In this way, the first base station can learn load statuses of different services based on loads corresponding to different service classification identifiers, and therefore can precisely perform interference control based on the load statuses of the different services, thereby implementing refined interference control at a service level, and improving network utilization and user experience. The interference control means reducing interference by performing at least one of scheduling, RRM, and the like.

The solutions provided in the embodiments of the present invention are mainly described above from the perspective of interaction between network elements. It may be understood that, to implement the foregoing functions, each network element such as the first base station or the second base station includes a corresponding hardware structure and/or software module for performing each function. A person of ordinary skill in the art should be easily aware that, in combination with the examples described in the algorithms steps of the embodiments disclosed in this specification, the invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function module division may be performed on the first base station and the second base station based on the foregoing method example. For example, each function module may be obtained through division for each corresponding function, or two or more functions may be integrated into one processing module. The integrated module may be implemented in a form of hardware, or may be implemented in a form of a software functional module. It should be noted that, in the embodiments of the present invention, module division is an example, and is merely a logical function division. In actual implementation, another division manner may be used.

Figure 7:
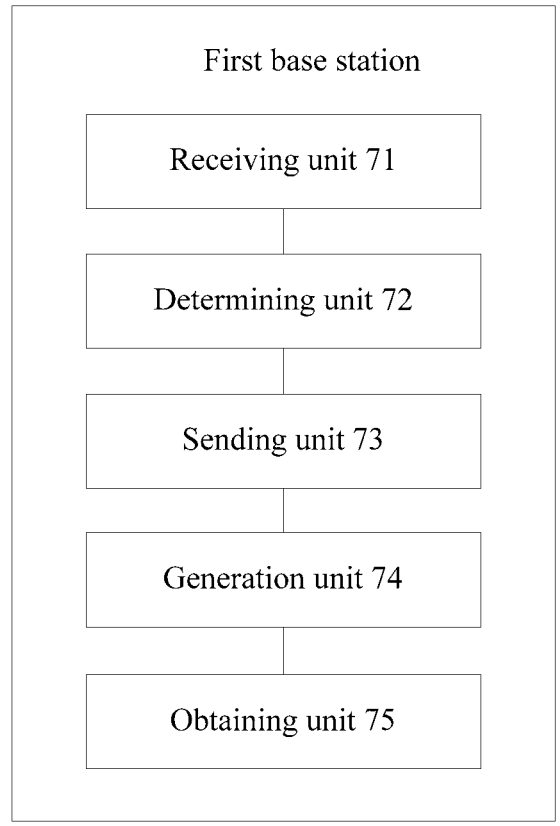
FIG. 7 is a schematic composition diagram of a first base station according to an embodiment of the present invention.

When each function module is obtained through division for each corresponding function, FIG. 7 is a possible schematic composition diagram of the first base station in the foregoing embodiments. As shown in FIG. 7, the first base station may include a receiving unit 71.

The receiving unit 71 is configured to support the first base station in performing step 407, step 409, and step 412 in the resource status information transmission method shown in FIG. 3A and FIG. 3B, step 506, step 508, and step 511 in the resource status information transmission method shown in FIG. 4A and FIG. 4B, and step 603 in the load information transmission method shown in FIG. 6.

In this embodiment of the present invention, further, as shown in FIG. 7, the first base station may include a determining unit 72, a sending unit 73, a generation unit 74, and an obtaining unit 75.

The determining unit 72 is configured to support the first base station in performing step 413 in the resource status information transmission method shown in FIG. 3A and FIG. 3B and step 512 in the resource status information transmission method shown in FIG. 4A and FIG. 4B.

The sending unit 73 is configured to support the first base station in performing step 403 in the resource status information transmission method shown in FIG. 3A and FIG. 3B and step 502 in the resource status information transmission method shown in FIG. 4A and FIG. 4B.

The generation unit 74 is configured to support the first base station in performing step 402 in the resource status information transmission method shown in FIG. 3A and FIG. 3B and step 501 in the resource status information transmission method shown in FIG. 4A and FIG. 4B.

The obtaining unit 75 is configured to support the first base station in performing step 401 in the resource status information transmission method shown in FIG. 3A and FIG. 3B.

It should be noted that all related content of each step in the foregoing method embodiments may be cited in function description of a corresponding function module. Details are not described herein.

The first base station provided in this embodiment of the present invention is configured to perform the resource status information transmission method, and therefore can achieve a same effect as the resource status information transmission method, or is configured to perform the load information transmission method, and therefore can achieve a same effect as the load information transmission method.

Figure 8:
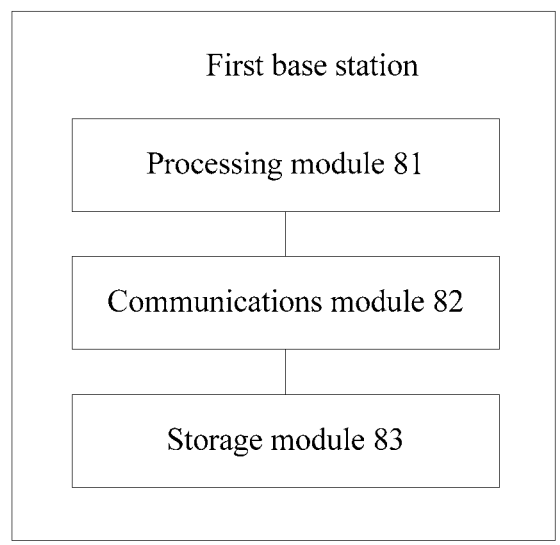
FIG. 8 is a schematic composition diagram of another first base station according to an embodiment of the present invention.

When an integrated unit is used, FIG. 8 is another possible schematic composition diagram of the first base station in the foregoing embodiments. As shown in FIG. 8, the first base station includes a processing module 81 and a communications module 82.

The processing module 81 is configured to control and manage an action of the first base station. For example, the processing module 81 is configured to support the first base station in performing step 401, step 402, and step 413 in the resource status information transmission method shown in FIG. 3A and FIG. 3B, step 501 and step 512 in the resource status information transmission method shown in FIG. 4A and FIG. 4B, and/or another process in the technology described in this specification. The communications module 82 is configured to support the first base station in communicating with another network entity, for example, support the first base station in performing step 403, step 407, step 409, and step 412 in the resource status information transmission method shown in FIG. 3A and FIG. 3B, step 502, step 506, step 508, and step 511 in the resource status information transmission method shown in FIG. 4A and FIG. 4B, and step 603 in the load information transmission method shown in FIG. 6, and in communicating with the function modules or the network entities shown in FIG. 1, FIG. 9, or FIG. 10. The first base station may further include a storage module 83, configured to store program code and data of the first base station.

The processing module 81 may be a processor or a controller. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications module 82 may be a transceiver, a transceiver circuit, a communications interface, or the like. The storage module 83 may be a memory.

When the processing module 81 is a processor, the communications module 82 is a transceiver, and the storage module 83 is a memory, the first base station in this embodiment of the present invention may be the base station shown in FIG. 2.

Figure 9:
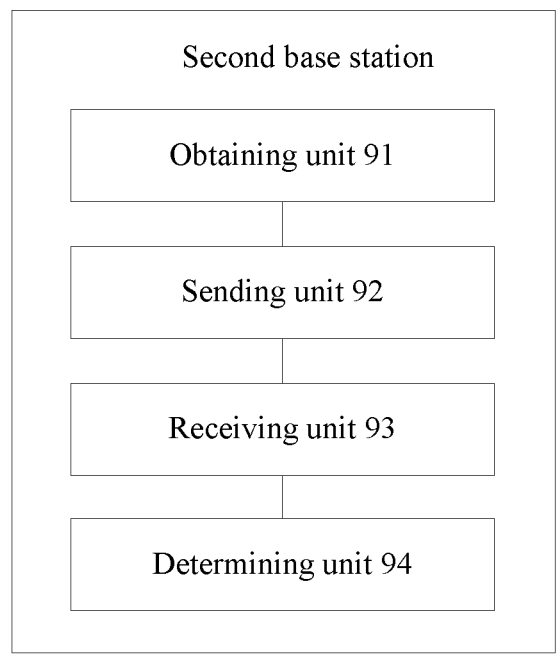
FIG. 9 is a schematic composition diagram of a second base station according to an embodiment of the present invention.

When each function module is obtained through division for each corresponding function, FIG. 9 is a possible schematic composition diagram of the second base station in the foregoing embodiments. As shown in FIG. 9, the second base station may include an obtaining unit 91 and a sending unit 92.

The obtaining unit 91 is configured to support the second base station in performing step 410 of obtaining resource status information in the resource status information transmission method shown in FIG. 3A and FIG. 3B, step 509 of obtaining resource status information in the resource status information transmission method shown in FIG. 4A and FIG. 4B, and step 601 in the load information transmission method shown in FIG. 6.

The sending unit 92 is configured to support the second base station in performing step 406, step 408, and step 411 in the resource status information transmission method shown in FIG. 3A and FIG. 3B, step 505, step 507, and step 510 in the resource status information transmission method shown in FIG. 4A and FIG. 4B, and step 602 in the load information transmission method shown in FIG. 6.

Further, in this embodiment of the present invention, as shown in FIG. 9, the second base station may include a receiving unit 93 and a determining unit 94.

The receiving unit 93 is configured to support the second base station in performing step 404 in the resource status information transmission method shown in FIG. 3A and FIG. 3B and step 503 in the resource status information transmission method shown in FIG. 4A and FIG. 4B.

The determining unit 94 is configured to support the second base station in performing step 405 and step 410 of determining a second cell identifier list and a second resource type set based on the first message in the resource status information transmission method shown in FIG. 3A and FIG. 3B and step 504 and step 509 of determining a second cell identifier list and a second resource type set based on the first message in the resource status information transmission method shown in FIG. 4A and FIG. 4B.

It should be noted that all related content of each step in the foregoing method embodiments may be cited in function description of a corresponding function module. Details are not described herein.

The second base station provided in this embodiment of the present invention is configured to perform the resource status information transmission method, and therefore can achieve a same effect as the resource status information transmission method, or is configured to perform the load information transmission method, and therefore can achieve a same effect as the load information transmission method.

Figure 10:
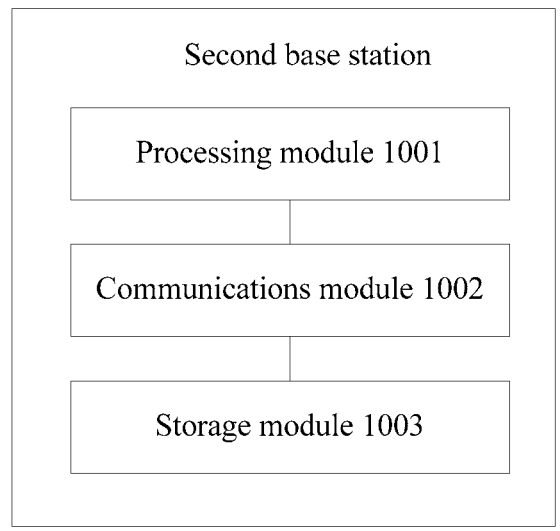
FIG. 10 is a schematic composition diagram of another second base station according to an embodiment of the present invention.

When an integrated unit is used, FIG. 10 is another possible schematic composition diagram of the second base station in the foregoing embodiments. As shown in FIG. 10, the second base station includes a processing module 1001 and a communications module 1002.

The processing module 1001 is configured to control and manage an action of the second base station. For example, the processing module 1001 is configured to support the second base station in performing step 405 and step 410 in the resource status information transmission method shown in FIG. 3A and FIG. 3B, step 504 and step 509 in the resource status information transmission method shown in FIG. 4A and FIG. 4B, and step 601 in the load information transmission method shown in FIG. 6. The communications module 1002 is configured to support the second base station in communicating with another network entity, for example, support the second base station in performing step 404, step 406, step 408, and step 411 in the resource status information transmission method shown in FIG. 3A and FIG. 3B, step 503, step 505, step 507, and step 510 in the resource status information transmission method shown in FIG. 4A and FIG. 4B, and step 602 in the load information transmission method shown in FIG. 6, and in communicating with the function modules or the network entities shown in FIG. 1, FIG. 7, or FIG. 8. The second base station may further include a storage module 1003, configured to store program code and data of the second base station.

The processing module 1001 may be a processor or a controller. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of a DSP and a microprocessor. The communications module 1002 may be a transceiver, a transceiver circuit, a communications interface, or the like. The storage module 1003 may be a memory.

When the processing module 1001 is a processor, the communications module 1002 is a transceiver, and the storage module 1003 is a memory, the second base station in this embodiment of the present invention may be the base station shown in FIG. 2.

Figure 11:
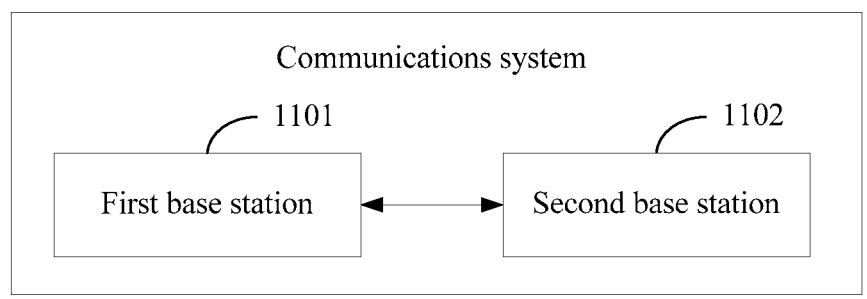
FIG. 11 is a schematic composition diagram of a communications system according to an embodiment of the present invention.

FIG. 11 is a schematic composition diagram of a communications system according to an embodiment of the present invention. As shown in FIG. 11, the communications system may include:

a first base station 1101, configured to perform corresponding steps in the resource status information transmission method shown in FIG. 3A and FIG. 3B or FIG. 4A and FIG. 4B; and a second base station 1102, configured to perform corresponding steps in the resource status information transmission method shown in FIG. 3A and FIG. 3B or FIG. 4A and FIG. 4B; or a first base station 1101, configured to perform corresponding steps in the load information transmission method shown in FIG. 6; and a second base station 1102, configured to perform corresponding steps in the load information transmission method shown in FIG. 6.

Figure 12:
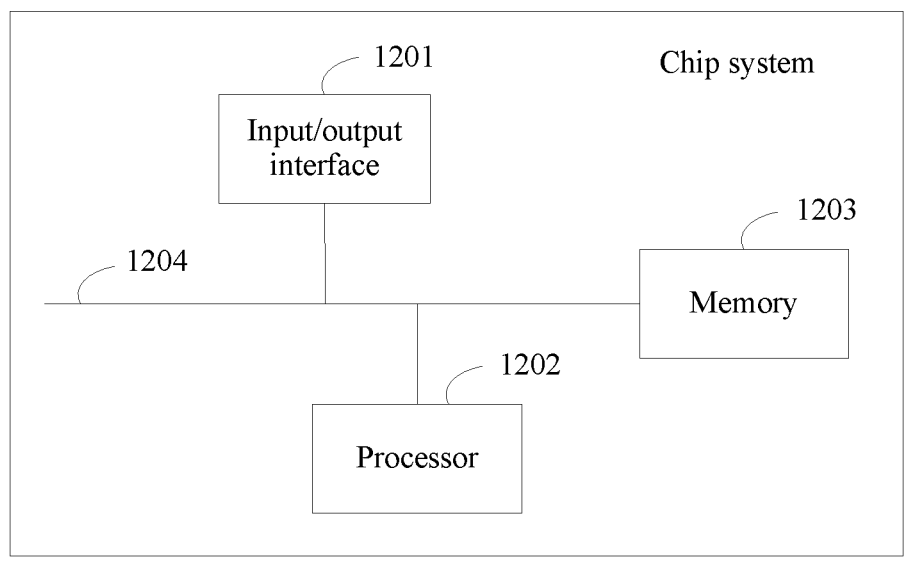
FIG. 12 is a schematic composition diagram of a chip system according to an embodiment of the present invention.

FIG. 12 is a schematic composition diagram of a chip system according to an embodiment of the present invention. As shown in FIG. 12, the chip system may include an input/output interface 1201, at least one processor 1202, a memory 1203, and a bus 1204.

The memory 1203 is configured to store a computer executable instruction. The processor 1202 is connected to the memory 1203 by using the bus 1204. When the chip system runs, the processor 1202 executes the computer executable instruction stored in the memory 1203, so that the chip system performs the behaviors of the first base station in the resource status information transmission method shown in FIG. 3A and FIG. 3B or FIG. 4A and FIG. 4B, or performs the behaviors of the first base station in the load information transmission method shown in FIG. 6.

Figure 13:
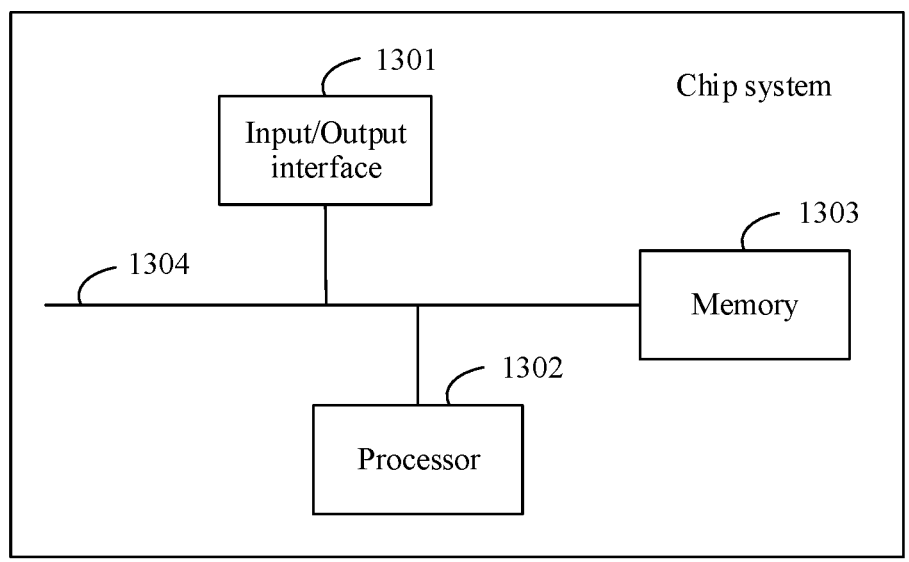
FIG. 13 is a schematic composition diagram of another chip system according to an embodiment of the present invention.

FIG. 13 is a schematic composition diagram of another chip system according to an embodiment of the present invention. As shown in FIG. 13, the chip system may include an input/output interface 1301, at least one processor 1302, a memory 1303, and a bus 1304.

The memory 1303 is configured to store a computer executable instruction. The processor 1302 is connected to the memory 1303 by using the bus 1304. When the chip system runs, the processor 1302 executes the computer executable instruction stored in the memory 1303, so that the chip system performs the behaviors of the second base station in the resource status information transmission method shown in FIG. 3A and FIG. 3B or FIG. 4A and FIG. 4B, or performs the behaviors of the second base station in the load information transmission method shown in FIG. 6.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, in other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of the present invention may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the present invention essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A resource status information transmission method, the method comprising:

sending, by a first base station, a first message to a second base station, wherein the first message indicates the second base station to report a resource status, wherein:
the first message comprises indication information, at least one cell identifier, and at least one resource type, wherein the indication information indicates the second base station to report resource status based on a network slice; or the first message comprises slice identification information of a network slice, at least one cell identifier, and at least one resource type;
wherein the at least one cell identifier comprises an identifier of a cell whose resource status needs to be reported, and wherein the at least one resource type comprises a type of a resource whose resource status needs to be reported; and
receiving, by the first base station, resource status information from the second base station, wherein the resource status information comprises slice identification information of the network slice and a resource status corresponding to the slice identification information of the network slice.

2. The method according to claim 1, the method further comprises:
determining, by the first base station and based on the resource status corresponding to the slice identification information of the network slice, a radio resource management (RRM) policy of a service corresponding to the slice identification information of the network slice.

3. The method according to claim 1, wherein the type of a resource whose resource status needs to be reported comprises one or more of the following: a physical resource block, a transport network layer, hardware, or a composite available capacity.

4. The method according to claim 1, wherein after the sending, by the first base station, a first message to the second base station, the method further comprises:
receiving, by the first base station, a second message from the second base station, wherein the second message comprises at least one of the following: a cell identifier list or a resource type set, wherein the cell identifier list comprises an identifier that is of a cell whose resource status can be reported and that is in the at least one cell identifier, and wherein the resource type set comprises a type that is of a resource whose resource status can be reported and that is in the at least one resource type.

5. The method according to claim 4, wherein:
the second message further comprises at least one of the following: slice identification information of at least one network slice, a failed cell identifier list, a type of a resource whose resource status cannot be reported and that is corresponding to a cell identifier comprised in the failed cell identifier list, or a cause that leads to a failure in reporting a resource status and that is corresponding to the cell identifier comprised in the failed cell identifier list;
wherein the slice identification information of at least one network slice comprises slice identification information of a network slice whose resource status cannot be reported, and wherein the failed cell identifier list comprises an identifier that is of a cell whose resource status cannot be reported and that is in the at least one cell identifier.

6. The method according to claim 1, wherein when the first message comprises the slice identification information of the network slice, the at least one cell identifier, and at least one resource type, the method further comprises:
generating, by the first base station, the first message, wherein different slice identification information of at least one network slice in the first message are corresponding to: at least one of different resource type sets, different cell identifier lists, different reporting periods, different reporting start indications, or different reporting end indications.

7. The method according to claim 1, wherein when the first message comprises the slice identification information of the network slice, the at least one cell identifier, and the at least one resource type, before the sending, by the first base station, a first message to the second base station, the method further comprises:
obtaining, by the first base station, the slice identification information of the network slice of a service provided by the second base station.

8. The method according to claim 2, wherein the service comprises at least one of the following:
an enhanced mobile broadband (eMBB) service,
a massive machine type communications (mMTC) service, or
an ultra-reliable and low-latency communications (URLLC) service.

9. An apparatus for a first base station, the apparatus comprising:
a first non-transitory memory storage comprising first instructions; and
at least one hardware processor in communication with the first non-transitory memory storage, wherein the at least one hardware processor executes the first instructions to:
send a first message to a second base station, wherein the first message indicates the second base station to report a resource status, wherein:
the first message comprises indication information, at least one cell identifier, and at least one resource type, wherein the indication information indicates the second base station to report resource status based on a network slice; or
the first message comprises slice identification information of a network slice, at least one cell identifier, and at least one resource type;
wherein the at least one cell identifier comprises an identifier of a cell whose resource status needs to be reported, and wherein the at least one resource type comprises a type of a resource whose resource status needs to be reported; and
receive resource status information from the second base station, wherein the resource status information comprises slice identification information of the network slice and a resource status corresponding to the slice identification information of the network slice.

10. The apparatus according to claim 9, wherein the at least one hardware processor executes the first instructions to:
determine, based on the resource status corresponding to the slice identification information of the network slice, a radio resource management (RRM) policy of a service corresponding to the slice identification information of the network slice.

11. The apparatus according to claim 9, wherein the type of a resource whose resource status needs to be reported comprises one or more of the following: a physical resource block, a transport network layer, hardware, or a composite available capacity.

12. The apparatus according to claim 9, wherein the at least one hardware processor executes the first instructions to:
after sending a first message to the second base station, receive a second message from the second base station, wherein the second message comprises at least one of the following: a cell identifier list or a resource type set, wherein the cell identifier list comprises an identifier that is of a cell whose resource status can be reported and that is in the at least one cell identifier, and wherein the resource type set comprises a type that is of a resource whose resource status can be reported and that is in the at least one resource type.

13. The apparatus according to claim 12, wherein the second message further comprises at least one of the following: slice identification information of at least one network slice, a failed cell identifier list, a type that is of a resource whose resource status cannot be reported and that is corresponding to a cell identifier comprised in the failed cell identifier list, or a cause that leads to a failure in reporting a resource status and that is corresponding to the cell identifier comprised in the failed cell identifier list; and
wherein the slice identification information of at least one network slice comprises slice identification information of a network slice whose resource status cannot be reported, and wherein the failed cell identifier list comprises an identifier that is of a cell whose resource status cannot be reported and that is in the at least one cell identifier.

14. The apparatus according to claim 9, wherein when the first message comprises the slice identification information of the network slice, the at least one cell identifier, and the at least one resource type, the at least one hardware processor executes the first instructions to:
generate the first message, wherein different slice identification information of at least one network slice in the first message are corresponding to: at least one of different resource type sets, different cell identifier lists, different reporting periods, different reporting start indications, or different reporting end indications.

15. The apparatus according to claim 9, wherein when the first message comprises the slice identification information of the network slice, the at least one cell identifier, and the at least one resource type, before the sending, by the first base station, a first message to the second base station, the at least one hardware processor executes the first instructions to:
obtain the slice identification information of the network slice of a service provided by the second base station.

16. The apparatus according to claim 10, wherein the service comprises at least one of the following: an enhanced mobile broadband (eMBB) service, a massive machine type communications (mMTC) service, or an ultra-reliable and low-latency communications (URLLC) service.

17. A non-transitory computer-readable storage medium for a first base station, wherein the non-transitory computer-readable storage medium stores an instruction, and wherein the instruction, when executed by at least one processor, causes the following operations to be performed:
sending, a first message to a second base station, wherein the first message indicates the second base station to report a resource status, wherein:
the first message comprises indication information, at least one cell identifier, and at least one resource type, wherein the indication information indicates the second base station to report resource status based on a network slice; or
the first message comprises slice identification information of a network slice, at least one cell identifier, and at least one resource type;
wherein the at least one cell identifier comprises an identifier of a cell whose resource status needs to be reported, and wherein the at least one resource type comprises a type of a resource whose resource status needs to be reported; and
receiving, resource status information from the second base station, wherein the resource status information comprises slice identification information of the network slice and a resource status corresponding to the slice identification information of the network slice.

18. The non-transitory computer-readable storage medium according to claim 17, wherein the instruction, when executed by the at least one processor, causes the following operation to be performed:
determining, based on the resource status corresponding to the slice identification information of the network slice, a radio resource management (RRM) policy of a service corresponding to the slice identification information of the network slice.

19. The non-transitory computer-readable storage medium according to claim 17, wherein the type of a resource whose resource status needs to be reported comprises one or more of the following: a physical resource block, a transport network layer, hardware, or a composite available capacity.

20. An apparatus for a second base station, the apparatus comprising:
a second non-transitory memory storage comprising second instructions; and
at least one hardware processor in communication with the second non-transitory memory storage, wherein the at least one hardware processor executes the second instructions to:
receive a first message from a first base station, wherein the first message indicates the apparatus to report a resource status, wherein:
the first message comprises indication information, at least one cell identifier, and at least one resource type, wherein the indication information indicates the apparatus to report resource status based on a network slice; or
the first message comprises slice identification information of a network slice, at least one cell identifier, and at least one resource type;
wherein the at least one cell identifier comprises an identifier of a cell whose resource status needs to be reported, and wherein the at least one resource type comprises a type of a resource whose resource status needs to be reported; and
send resource status information to the first base station, wherein the resource status information comprises slice identification information of the network slice and a resource status corresponding to the slice identification information of the network slice.

21. The apparatus according to claim 20, wherein the resource status information facilitates the first base station to determine, based on the resource status corresponding to the slice identification information of the network slice, a radio resource management (RRM) policy of a service corresponding to the slice identification information of the network slice.

22. The apparatus according to claim 20, wherein the type of a resource whose resource status needs to be reported comprises one or more of the following: a physical resource block, a transport network layer, hardware, or a composite available capacity.

23. A communication system for resource status information transmission, comprising: a first base station and a second base station, wherein:

the first base station is configured to send a first message to the second base station, wherein the first message indicates the second base station to report a resource status, wherein:
- the first message comprises indication information, at least one cell identifier, and at least one resource type, wherein the indication information indicates the second base station to report resource status based on a network slice; or
- the first message comprises slice identification information of a network slice, at least one cell identifier, and at least one resource type;
- wherein the at least one cell identifier comprises an identifier of a cell whose resource status needs to be reported, and wherein the at least one resource type comprises a type of a resource whose resource status needs to be reported; and the second base station is configured to:
- receive the first message; and
- send resource status information to the first base station, wherein the resource status information comprises slice identification information of the network slice and a resource status corresponding to the slice identification information of the network slice.

24. The communication system according to claim 23, wherein:
- the first base station is configured to determine, based on the resource status corresponding to the slice identification information of the network slice, a radio resource management (RRM) policy of a service corresponding to the slice identification information of the network slice.

25. The communication system according to claim 23, wherein the type of a resource whose resource status needs to be reported comprises one or more of the following: a physical resource block, a transport network layer, hardware, or a composite available capacity.

* * * * *